(12) United States Patent
Manley et al.

(10) Patent No.: US 8,382,045 B2
(45) Date of Patent: Feb. 26, 2013

(54) SHAPE-CHANGING CONTROL SURFACE

(75) Inventors: David J. Manley, Huntington Beach, CA (US); Robert E. Grip, Rancho Palos Verdes, CA (US)

(73) Assignee: The Boeing Company, Chicago, IL (US)

( * ) Notice: Subject to any disclaimer, the term of this patent is extended or adjusted under 35 U.S.C. 154(b) by 342 days.

(21) Appl. No.: 12/506,462

(22) Filed: Jul. 21, 2009

(65) Prior Publication Data

US 2011/0017876 A1   Jan. 27, 2011

(51) Int. Cl.
B64C 3/44 (2006.01)
(52) U.S. Cl. .................. 244/219; 244/218; 244/213
(58) Field of Classification Search .................. 244/219, 244/201, 215, 135 R, 38, 213
See application file for complete search history.

(56) References Cited

U.S. PATENT DOCUMENTS

| | | | |
|---|---|---|---|
| 1,431,520 A | 10/1922 | Hall | |
| 1,724,456 A | 8/1929 | Crook | |
| 1,770,575 A | 7/1930 | Ksoll | |
| 2,086,085 A | 7/1937 | Lachmann et al. | |
| 2,169,416 A | 8/1939 | Griswold | |
| 2,236,482 A | 3/1941 | Ernst | |
| 2,282,516 A | 5/1942 | Gropler et al. | |
| 2,289,704 A | 7/1942 | Grant | |
| 2,319,383 A | 5/1943 | Zap | |
| 2,347,230 A | 4/1944 | Zuck | |
| 2,358,985 A | 9/1944 | McAndrew | |
| 2,378,528 A | 6/1945 | Arsandaux | |
| 2,383,102 A | 8/1945 | Zap | |
| 2,385,351 A | 9/1945 | Davidsen | |
| 2,387,492 A | 10/1945 | Blaylock et al. | |
| 2,389,274 A | 11/1945 | Pearsall et al. | |
| 2,399,461 A | 4/1946 | Brown | |
| 2,406,475 A | 8/1946 | Windsor | |
| 2,422,296 A | 6/1947 | Flader et al. | |
| 2,444,293 A | 6/1948 | Holt | |
| 2,458,900 A | 1/1949 | Erny | |
| 2,504,684 A | 4/1950 | Harper | |
| 2,518,854 A | 8/1950 | Badenoch | |
| 2,563,453 A | 8/1951 | Briend | |
| 2,652,812 A | 9/1953 | Fenzl | |

(Continued)

FOREIGN PATENT DOCUMENTS

| | | |
|---|---|---|
| DE | 387833 | 1/1924 |
| DE | 1129379 | 5/1962 |

(Continued)

OTHER PUBLICATIONS

PCT International Search for application PCT/US2010/040243 dated Nov. 9, 2010.

(Continued)

*Primary Examiner* — Christopher P Ellis
*Assistant Examiner* — Medhat Badawi
(74) *Attorney, Agent, or Firm* — Yee & Associates, P.C.

(57) ABSTRACT

A method and apparatus for controlling the shape of a control surface. A structure is rotated about an axis. The structure is located between a flexible skin and a skin located substantially opposite of the flexible skin. An assembly is moved to change the shape of the control surface in response to a rotation of the structure. The assembly is movably connected to the structure and is configured to move such that the flexible skin forms a plurality of curvatures.

17 Claims, 13 Drawing Sheets

U.S. PATENT DOCUMENTS

| | | |
|---|---|---|
| 2,665,084 A | 1/1954 | Feeney et al. |
| 2,864,239 A | 9/1958 | Clark |
| 2,851,229 A | 12/1958 | Taylor |
| 2,877,968 A | 3/1959 | Granan et al. |
| 2,886,008 A | 5/1959 | Geyer et al. |
| 2,891,740 A | 6/1959 | Campbell |
| 2,892,312 A | 6/1959 | Allen et al. |
| 2,899,152 A | 8/1959 | Weiland |
| 2,912,190 A | 11/1959 | Macdonough |
| 2,920,844 A | 1/1960 | Marshall et al. |
| 2,938,680 A | 5/1960 | Greene et al. |
| 2,990,144 A | 6/1961 | Hougland |
| 2,990,145 A | 6/1961 | Hougland |
| 3,013,748 A | 12/1961 | Westburg |
| 3,089,666 A | 5/1963 | Quenzler |
| 3,090,584 A | 5/1963 | Dietrich et al. |
| 3,102,607 A | 9/1963 | Roberts |
| 3,112,089 A | 11/1963 | Silvius |
| 3,119,333 A | 1/1964 | Loughran |
| 3,126,171 A | 3/1964 | Stepniewski et al. |
| 3,136,504 A | 6/1964 | Carr |
| 3,166,271 A | 1/1965 | Zuck |
| 3,191,147 A | 6/1965 | Adair |
| 3,193,214 A | 7/1965 | Lee |
| 3,203,275 A | 8/1965 | Hoover |
| 3,203,647 A | 8/1965 | Alvarez |
| 3,263,946 A | 8/1966 | Roberts et al. |
| 3,282,536 A | 11/1966 | Steiner |
| 3,293,546 A | 11/1966 | Calvert et al. |
| 3,302,602 A | 2/1967 | Korganoff |
| 3,302,604 A | 2/1967 | Stuteville |
| 3,375,988 A | 4/1968 | Hude et al. |
| 3,423,858 A | 1/1969 | Speno |
| 3,447,763 A | 6/1969 | Allcock et al. |
| 3,463,418 A | 8/1969 | Miksch |
| 3,504,870 A | 4/1970 | Cole et al. |
| 3,528,632 A | 9/1970 | Miles et al. |
| 3,539,133 A | 11/1970 | Robertson |
| 3,556,439 A | 1/1971 | Autry et al. |
| 3,572,611 A | 3/1971 | Oulton |
| 3,587,311 A | 6/1971 | Hays |
| 3,589,648 A | 6/1971 | Gorham et al. |
| 3,623,444 A | 11/1971 | Lang |
| 3,642,234 A | 2/1972 | Kamber et al. |
| 3,653,611 A | 4/1972 | Trupp et al. |
| 3,659,810 A | 5/1972 | Robertson |
| 3,677,504 A | 7/1972 | Schwarzler |
| 3,698,668 A | 10/1972 | Cole |
| 3,704,828 A | 12/1972 | Studer et al. |
| 3,704,843 A | 12/1972 | Jenny |
| 3,711,039 A | 1/1973 | James |
| 3,721,406 A | 3/1973 | Hurlbert |
| 3,730,459 A | 5/1973 | Zuck |
| 3,743,219 A | 7/1973 | Gorges |
| 3,767,140 A | 10/1973 | Johnson |
| 3,794,276 A | 2/1974 | Maltby et al. |
| 3,804,267 A | 4/1974 | Cook et al. |
| 3,807,447 A | 4/1974 | Masuda |
| 3,813,062 A | 5/1974 | Prather |
| 3,815,773 A | 6/1974 | Duvall et al. |
| 3,827,658 A | 8/1974 | Hallworth |
| 3,831,886 A | 8/1974 | Burdges et al. |
| 3,836,099 A | 9/1974 | O'Neill et al. |
| 3,837,601 A | 9/1974 | Cole |
| 3,848,558 A | 11/1974 | Henry |
| 3,862,730 A | 1/1975 | Heiney |
| 3,874,617 A | 4/1975 | Johnson |
| 3,891,740 A | 6/1975 | Vannan, Jr. |
| 3,897,029 A | 7/1975 | Calderon |
| 3,904,152 A | 9/1975 | Hill |
| 3,910,530 A | 10/1975 | James et al. |
| 3,913,450 A | 10/1975 | MacGregor |
| 3,913,647 A | 10/1975 | Arnn |
| 3,917,192 A | 11/1975 | Alvarez-Calderon |
| 3,931,374 A | 1/1976 | Moutet nee Layrisse et al. |
| 3,937,208 A | 2/1976 | Katz et al. |
| 3,941,334 A | 3/1976 | Cole |
| 3,941,341 A | 3/1976 | Brogdon, Jr. |
| 3,949,957 A | 4/1976 | Portier |
| 3,968,946 A | 7/1976 | Cole |
| 3,971,534 A | 7/1976 | Grotz |
| 3,978,555 A | 9/1976 | Weisenthal |
| 3,985,319 A | 10/1976 | Dean et al. |
| 3,987,983 A | 10/1976 | Cole |
| 3,991,574 A | 11/1976 | Frazier |
| 3,992,979 A | 11/1976 | Smith |
| 3,993,584 A | 11/1976 | Owen et al. |
| 3,994,451 A | 11/1976 | Cole |
| 3,994,452 A | 11/1976 | Cole |
| 4,004,755 A | 1/1977 | Hooper |
| 4,011,888 A | 3/1977 | Whelchel et al. |
| 4,015,787 A | 4/1977 | Maieli et al. |
| 4,019,696 A | 4/1977 | Hirt et al. |
| 4,053,124 A | 10/1977 | Cole |
| 4,069,811 A | 1/1978 | Tabor |
| 4,106,730 A | 8/1978 | Spitzer et al. |
| 4,117,996 A | 10/1978 | Sherman |
| 4,120,470 A | 10/1978 | Whitener |
| 4,131,253 A | 12/1978 | Zapel |
| 4,141,768 A | 2/1979 | Lo et al. |
| 4,146,200 A | 3/1979 | Borzachillo |
| 4,165,846 A | 8/1979 | Groeger |
| 4,171,787 A | 10/1979 | Zapel |
| 4,180,222 A | 12/1979 | Thornburg |
| 4,181,275 A | 1/1980 | Moelter et al. |
| 4,189,120 A | 2/1980 | Wang |
| 4,189,121 A | 2/1980 | Harper et al. |
| 4,189,122 A | 2/1980 | Miller |
| 4,200,253 A | 4/1980 | Rowarth |
| 4,202,519 A | 5/1980 | Fletcher |
| D255,789 S | 7/1980 | Bowers |
| 4,240,255 A | 12/1980 | Benilan |
| 4,247,066 A | 1/1981 | Frost et al. |
| 4,247,843 A | 1/1981 | Miller et al. |
| 4,252,287 A | 2/1981 | Zimmer |
| 4,262,868 A | 4/1981 | Dean |
| 4,267,990 A | 5/1981 | Staudacher |
| 4,275,942 A | 6/1981 | Steidl |
| 4,283,029 A | 8/1981 | Rudolph |
| 4,285,482 A | 8/1981 | Lewis |
| 4,293,110 A | 10/1981 | Middleton et al. |
| 4,312,486 A | 1/1982 | McKinney |
| 4,325,123 A | 4/1982 | Graham et al. |
| 4,351,502 A | 9/1982 | Statkus |
| 4,353,517 A | 10/1982 | Rudolph |
| 4,358,077 A | 11/1982 | Coronel |
| 4,360,176 A | 11/1982 | Brown |
| 4,363,098 A | 12/1982 | Buus et al. |
| 4,365,774 A | 12/1982 | Coronel |
| 4,368,937 A | 1/1983 | Palombo et al. |
| 4,384,693 A | 5/1983 | Pauly et al. |
| 4,426,054 A | 1/1984 | Wang |
| 4,427,168 A | 1/1984 | McKinney et al. |
| 4,429,844 A | 2/1984 | Brown et al. |
| 4,441,675 A | 4/1984 | Boehringer et al. |
| 4,444,368 A | 4/1984 | Andrews |
| 4,447,028 A | 5/1984 | Wang |
| 4,448,375 A | 5/1984 | Herndon |
| 4,459,084 A | 7/1984 | Clark |
| 4,461,449 A | 7/1984 | Turner |
| 4,471,925 A | 9/1984 | Kunz |
| 4,471,927 A | 9/1984 | Rudolph et al. |
| 4,472,780 A | 9/1984 | Chenoweth et al. |
| 4,475,702 A | 10/1984 | Cole |
| 4,479,620 A | 10/1984 | Rogers et al. |
| 4,485,992 A | 12/1984 | Rao |
| 4,496,121 A | 1/1985 | Berlin |
| 4,498,646 A | 2/1985 | Proksch et al. |
| 4,528,775 A | 7/1985 | Einarsson |
| 4,533,096 A | 8/1985 | Baker et al. |
| 4,542,869 A | 9/1985 | Brine |
| 4,544,117 A | 10/1985 | Schuster |
| 4,553,722 A | 11/1985 | Cole |
| 4,575,030 A | 3/1986 | Gratzer |
| 4,575,099 A | 3/1986 | Nash |
| 4,576,347 A | 3/1986 | Opsahl |
| 4,605,187 A | 8/1986 | Stephenson |

| | | |
|---|---|---|
| 4,637,573 A | 1/1987 | Perin et al. |
| 4,650,140 A | 3/1987 | Cole |
| 4,662,587 A | 5/1987 | Whitener |
| 4,691,879 A | 9/1987 | Greene |
| 4,700,911 A | 10/1987 | Zimmer |
| 4,702,441 A | 10/1987 | Wang |
| 4,702,442 A | 10/1987 | Weiland et al. |
| 4,706,913 A | 11/1987 | Cole |
| 4,709,880 A | 12/1987 | Bradfield et al. |
| 4,712,752 A | 12/1987 | Victor |
| 4,717,097 A | 1/1988 | Sepstrup |
| 4,720,066 A | 1/1988 | Renken et al. |
| 4,729,528 A | 3/1988 | Borzachillo |
| 4,747,375 A | 5/1988 | Williams |
| 4,776,537 A * | 10/1988 | Garside et al. ............. 244/135 R |
| 4,779,822 A | 10/1988 | Burandt et al. |
| 4,784,355 A | 11/1988 | Brine |
| 4,786,013 A | 11/1988 | Pohl |
| 4,789,119 A | 12/1988 | Bellego et al. |
| 4,796,192 A | 1/1989 | Lewis |
| 4,823,836 A | 4/1989 | Bachmann et al. |
| 4,834,319 A | 5/1989 | Ewy et al. |
| 4,838,503 A | 6/1989 | Williams |
| 4,854,528 A | 8/1989 | Hofrichter |
| 4,856,735 A | 8/1989 | Lotz et al. |
| 4,860,007 A | 8/1989 | Konicke et al. |
| 4,867,394 A | 9/1989 | Patterson, Jr. |
| 4,892,274 A | 1/1990 | Pohl et al. |
| 4,899,284 A | 2/1990 | Lewis et al. |
| 4,962,902 A | 10/1990 | Fortes |
| 5,009,374 A | 4/1991 | Manfredi et al. |
| 5,039,032 A | 8/1991 | Rudolph |
| 5,046,688 A | 9/1991 | Woods |
| 5,050,081 A | 9/1991 | Abbott et al. |
| 5,056,741 A | 10/1991 | Bliesner et al. |
| 5,062,589 A | 11/1991 | Roth et al. |
| 5,074,495 A | 12/1991 | Raymond |
| 5,082,207 A | 1/1992 | Tulinius |
| 5,082,208 A | 1/1992 | Matich |
| 5,088,665 A | 2/1992 | Vijgen et al. |
| 5,094,411 A | 3/1992 | Rao |
| 5,094,412 A | 3/1992 | Narramore |
| 5,100,082 A | 3/1992 | Archung |
| 5,114,100 A | 5/1992 | Rudolph et al. |
| 5,129,597 A | 7/1992 | Manthey et al. |
| 5,158,252 A | 10/1992 | Sakurai |
| 5,167,383 A | 12/1992 | Nozaki |
| 5,170,964 A | 12/1992 | Enderle et al. |
| 5,203,619 A | 4/1993 | Welsch et al. |
| 5,207,400 A | 5/1993 | Jennings |
| 5,242,132 A | 9/1993 | Wukowitz |
| 5,244,269 A | 9/1993 | Harriehausen et al. |
| 5,259,293 A | 11/1993 | Brunner |
| 5,280,863 A | 1/1994 | Schmittle |
| 5,282,591 A | 2/1994 | Walters et al. |
| 5,310,387 A | 5/1994 | Savagian |
| 5,351,914 A | 10/1994 | Nagao et al. |
| 5,388,788 A | 2/1995 | Rudolph |
| 5,420,582 A | 5/1995 | Kubbat et al. |
| 5,441,218 A | 8/1995 | Mueller et al. |
| 5,474,265 A | 12/1995 | Capbern et al. |
| 5,478,016 A | 12/1995 | Mansfield |
| 5,493,497 A | 2/1996 | Buus |
| 5,535,852 A | 7/1996 | Bishop et al. |
| 5,542,684 A | 8/1996 | Squirrell |
| 5,544,847 A | 8/1996 | Bliesner |
| 5,564,655 A | 10/1996 | Garland et al. |
| 5,593,112 A | 1/1997 | Maier et al. |
| 5,600,220 A | 2/1997 | Thoraval et al. |
| 5,609,020 A | 3/1997 | Jackson et al. |
| D382,851 S | 8/1997 | Knutson et al. |
| 5,653,404 A | 8/1997 | Ploshkin |
| 5,680,120 A | 10/1997 | Tilleman |
| 5,680,124 A | 10/1997 | Bedell et al. |
| 5,681,014 A | 10/1997 | Palmer |
| 5,686,907 A | 11/1997 | Bedell et al. |
| 5,711,496 A | 1/1998 | Nusbaum |
| 5,715,163 A | 2/1998 | Bang et al. |
| 5,735,485 A | 4/1998 | Ciprian et al. |
| 5,740,991 A | 4/1998 | Gleine et al. |
| 5,743,490 A | 4/1998 | Gillingham et al. |
| 5,788,184 A | 8/1998 | Eddy |
| 5,788,190 A | 8/1998 | Siers |
| 5,839,698 A | 11/1998 | Moppert |
| 5,875,998 A | 3/1999 | Gleine et al. |
| 5,887,828 A | 3/1999 | Appa |
| 5,915,653 A | 6/1999 | Koppelman |
| 5,921,506 A | 7/1999 | Appa |
| 5,927,656 A | 7/1999 | Hinkleman |
| 5,934,615 A | 8/1999 | Treichler et al. |
| 5,978,715 A | 11/1999 | Briffe et al. |
| 5,984,230 A | 11/1999 | Orazi |
| D418,840 S | 1/2000 | Cota et al. |
| 6,010,098 A | 1/2000 | Campanile et al. |
| 6,015,117 A | 1/2000 | Broadbent |
| 6,033,180 A | 3/2000 | Machida |
| 6,045,096 A * | 4/2000 | Rinn et al. ................... 244/219 |
| 6,045,204 A | 4/2000 | Frazier et al. |
| 6,047,923 A | 4/2000 | Lafferty |
| 6,057,786 A | 5/2000 | Briffe et al. |
| 6,073,624 A | 6/2000 | Laurent |
| 6,076,757 A | 6/2000 | Holzapfel |
| 6,076,767 A | 6/2000 | Farley et al. |
| 6,076,776 A | 6/2000 | Breitbach et al. |
| 6,079,672 A | 6/2000 | Lam et al. |
| 6,082,679 A | 7/2000 | Crouch et al. |
| 6,085,129 A | 7/2000 | Schardt et al. |
| 6,109,567 A | 8/2000 | Munoz |
| 6,112,141 A | 8/2000 | Briffe et al. |
| 6,138,957 A | 10/2000 | Nastasi et al. |
| 6,145,791 A | 11/2000 | Diller et al. |
| 6,152,405 A | 11/2000 | Muller |
| 6,161,801 A | 12/2000 | Kelm et al. |
| 6,164,563 A | 12/2000 | Bouiller et al. |
| 6,164,598 A | 12/2000 | Young et al. |
| 6,173,924 B1 | 1/2001 | Young et al. |
| 6,189,837 B1 | 2/2001 | Matthews |
| 6,202,442 B1 | 3/2001 | Brugerolle |
| 6,213,433 B1 | 4/2001 | Gruensfelder et al. |
| 6,227,498 B1 | 5/2001 | Arata |
| 6,244,542 B1 | 6/2001 | Young et al. |
| 6,293,497 B1 | 9/2001 | Kelley-Wickemeyer et al. |
| 6,328,265 B1 | 12/2001 | Dizdarevic |
| 6,349,798 B1 | 2/2002 | McKay |
| 6,349,903 B2 | 2/2002 | Caton et al. |
| 6,364,254 B1 | 4/2002 | May |
| 6,375,126 B1 | 4/2002 | Sakurai et al. |
| 6,382,566 B1 | 5/2002 | Ferrel et al. |
| 6,389,333 B1 | 5/2002 | Hansman et al. |
| 6,394,392 B1 | 5/2002 | Lafferty |
| 6,431,498 B1 | 8/2002 | Watts et al. |
| 6,439,512 B1 | 8/2002 | Hart |
| 6,443,394 B1 | 9/2002 | Weisend, Jr. |
| 6,450,457 B1 | 9/2002 | Sharp |
| 6,464,175 B2 | 10/2002 | Yada et al. |
| 6,466,141 B1 | 10/2002 | McKay et al. |
| 6,478,541 B1 | 11/2002 | Charles et al. |
| 6,481,667 B1 | 11/2002 | Ho |
| 6,484,969 B2 | 11/2002 | Sprenger et al. |
| 6,499,577 B2 | 12/2002 | Kitamoto et al. |
| 6,536,714 B2 | 3/2003 | Gleine et al. |
| 6,547,183 B2 | 4/2003 | Farnsworth |
| 6,554,229 B1 | 4/2003 | Lam et al. |
| 6,558,823 B1 | 5/2003 | Pinney |
| 6,561,463 B1 | 5/2003 | Yount et al. |
| 6,565,037 B1 | 5/2003 | Tonkovich |
| 6,568,189 B2 | 5/2003 | Blot-Carretero et al. |
| D475,340 S | 6/2003 | Arata et al. |
| 6,591,169 B2 | 7/2003 | Jones et al. |
| 6,598,829 B2 | 7/2003 | Kamstra |
| 6,598,834 B2 | 7/2003 | Nettle et al. |
| 6,601,801 B1 | 8/2003 | Prow et al. |
| 6,622,972 B2 | 9/2003 | Urnes, Sr. et al. |
| 6,622,974 B1 | 9/2003 | Dockter et al. |
| 6,625,982 B2 | 9/2003 | Van Den Bossche et al. |
| 6,644,599 B2 | 11/2003 | Perez |
| 6,651,930 B1 | 11/2003 | Gautier et al. |
| 6,655,313 B1 | 12/2003 | Woodall et al. |

| | | |
|---|---|---|
| D486,776 S | 2/2004 | Carr |
| 6,688,099 B2 | 2/2004 | Lair |
| 6,698,523 B2 | 3/2004 | Barber |
| 6,729,575 B2 | 5/2004 | Bevilaqua |
| 6,729,583 B2 | 5/2004 | Milliere |
| 6,745,113 B2 | 6/2004 | Griffin, III et al. |
| 6,755,375 B2 | 6/2004 | Trikha |
| 6,794,526 B2 | 9/2004 | Beck et al. |
| 6,796,534 B2 | 9/2004 | Beyer et al. |
| 6,799,739 B1 | 10/2004 | Jones |
| 6,802,475 B2 | 10/2004 | Davies et al. |
| 6,824,099 B1 | 11/2004 | Jones |
| 6,843,452 B1 | 1/2005 | Vassberg et al. |
| 6,848,647 B2 | 2/2005 | Albrecht |
| 6,857,600 B1 | 2/2005 | Walker et al. |
| 6,860,449 B1 | 3/2005 | Chen |
| 6,860,452 B2 | 3/2005 | Bacon et al. |
| 6,870,490 B2 | 3/2005 | Sherry et al. |
| 6,883,503 B2 | 4/2005 | Carroll |
| 6,923,403 B1 | 8/2005 | Dizdarevic et al. |
| 6,970,773 B2 | 11/2005 | Phillips |
| 6,978,971 B1 | 12/2005 | Dun |
| 6,981,676 B2 | 1/2006 | Milliere |
| 7,007,889 B2 | 3/2006 | Charron |
| 7,007,897 B2 | 3/2006 | Wingett et al. |
| 7,028,948 B2 | 4/2006 | Pitt |
| 7,048,228 B2 | 5/2006 | Vassberg et al. |
| 7,048,234 B2 | 5/2006 | Recksiek et al. |
| 7,048,235 B2 | 5/2006 | McLean et al. |
| 7,051,975 B2 | 5/2006 | Pohl et al. |
| 7,051,982 B1 | 5/2006 | Johnson |
| 7,059,563 B2 | 6/2006 | Huynh |
| 7,093,793 B2 | 8/2006 | Lair |
| 7,093,798 B2 | 8/2006 | Whelan et al. |
| 7,097,136 B2 | 8/2006 | Ruszkowski, Jr. |
| 7,147,241 B2 | 12/2006 | Beaujot et al. |
| 7,156,342 B2 | 1/2007 | Heaven, Jr. et al. |
| 7,177,731 B2 | 2/2007 | Sandell et al. |
| 7,188,007 B2 | 3/2007 | Boorman et al. |
| 7,226,020 B2 | 6/2007 | Pohl et al. |
| 7,252,264 B2 | 8/2007 | Nattinger |
| 7,258,308 B2 | 8/2007 | Beyer et al. |
| 7,264,206 B2 | 9/2007 | Wheaton et al. |
| 7,270,305 B2 | 9/2007 | Rampton et al. |
| 7,300,021 B2 | 11/2007 | Voogt |
| 7,306,187 B2 | 12/2007 | Lavan |
| 7,309,043 B2 | 12/2007 | Good et al. |
| 7,321,318 B2 | 1/2008 | Crane et al. |
| 7,322,547 B2 | 1/2008 | Konings |
| 7,338,018 B2 | 3/2008 | Huynh et al. |
| 7,357,358 B2 | 4/2008 | Lacy et al. |
| D573,939 S | 7/2008 | Las Heras |
| 7,418,319 B2 | 8/2008 | Chen et al. |
| 7,424,350 B2 | 9/2008 | Speer |
| 7,455,264 B2 | 11/2008 | Wakayama |
| 7,460,029 B2 | 12/2008 | Boorman et al. |
| 7,475,854 B2 | 1/2009 | Lacy et al. |
| 7,487,936 B2 | 2/2009 | Heaven, Jr. |
| 7,494,094 B2 | 2/2009 | Good et al. |
| 7,500,641 B2 | 3/2009 | Sakurai et al. |
| 7,506,842 B2 | 3/2009 | Jones |
| 7,510,151 B2 | 3/2009 | Perez-Sanchez |
| D589,868 S | 4/2009 | Matharan et al. |
| 7,530,533 B2 | 5/2009 | Perez-Sanchez |
| 7,559,507 B2 | 7/2009 | Harrison et al. |
| 7,559,733 B2 | 7/2009 | Khan et al. |
| D598,838 S | 8/2009 | Carr et al. |
| 7,577,501 B2 | 8/2009 | Tafs et al. |
| 7,611,099 B2 | 11/2009 | Kordel et al. |
| 7,665,689 B2 | 2/2010 | McComb |
| 7,699,270 B2 | 4/2010 | Lonsinger et al. |
| 7,708,231 B2 | 5/2010 | Lacy et al. |
| 7,717,370 B2 | 5/2010 | Levy |
| D616,804 S | 6/2010 | Manley et al. |
| 7,726,609 B2 | 6/2010 | Shmilovich et al. |
| 7,740,202 B2 | 6/2010 | Namaizawa et al. |

| | | |
|---|---|---|
| 7,751,947 B2 | 7/2010 | Gunn et al. |
| 7,753,311 B2 | 7/2010 | Gustafsson |
| 7,793,884 B2 | 9/2010 | Dizdarevic et al. |
| 7,797,889 B2 | 9/2010 | McClintock et al. |
| 7,823,840 B2 | 11/2010 | Shmilovich et al. |
| 7,878,192 B2 | 2/2011 | Larsen |
| 7,878,458 B2 | 2/2011 | Shmilovich et al. |
| 7,905,227 B2 | 3/2011 | Luconi et al. |
| 7,918,421 B2 | 4/2011 | Voglsinger et al. |
| 7,938,358 B2 | 5/2011 | Dietrich et al. |
| 8,056,865 B2 | 11/2011 | Grip |
| 8,061,145 B2 | 11/2011 | Gustafsson |
| 8,061,655 B1 | 11/2011 | Manley et al. |
| 8,127,530 B2 | 3/2012 | Lair et al. |
| 2002/0046087 A1 | 4/2002 | Hey |
| 2003/0132860 A1 | 7/2003 | Feyereisen et al. |
| 2005/0216141 A1 | 9/2005 | Phillips |
| 2006/0038086 A1 | 2/2006 | Reckzeh |
| 2006/0049301 A1 | 3/2006 | Yam et al. |
| 2006/0175468 A1 | 8/2006 | Huynh et al. |
| 2007/0018034 A1 | 1/2007 | Dickau |
| 2007/063099 A1 | 3/2007 | Holloman, Jr. |
| 2010/0133382 A1 | 6/2010 | Pahl |
| 2010/0155532 A1 | 6/2010 | Martin et al. |
| 2010/0200689 A1 | 8/2010 | Grip |
| 2010/0224734 A1* | 9/2010 | Grip .............. 244/219 |
| 2011/0001000 A1 | 1/2011 | Zhu |
| 2011/0101158 A1 | 5/2011 | Welch et al. |
| 2011/0155840 A1 | 6/2011 | Lind, Jr. et al. |
| 2012/0056038 A1 | 3/2012 | Grip |

FOREIGN PATENT DOCUMENTS

| | | |
|---|---|---|
| DE | 102004062998 A1 | 7/2006 |
| EP | 0100775 A1 | 2/1984 |
| EP | 0103038 | 3/1984 |
| EP | 0215211 | 3/1987 |
| EP | 0370640 | 5/1990 |
| EP | 0483504 | 5/1992 |
| EP | 0489521 | 6/1992 |
| EP | 0781704 A1 | 2/1997 |
| EP | 0947421 A1 | 6/1999 |
| EP | 1010616 | 6/2000 |
| EP | 1205383 | 5/2002 |
| EP | 1338506 | 8/2003 |
| EP | 1398269 A1 | 3/2004 |
| EP | 1462361 | 9/2004 |
| EP | 1547917 | 6/2005 |
| FR | 705155 | 6/1931 |
| FR | 984443 | 7/1951 |
| FR | 56121 | 9/1952 |
| FR | 57988 | 9/1953 |
| FR | 58273 | 11/1953 |
| FR | 2610254 | 8/1988 |
| GB | 886136 | 1/1962 |
| GB | 1181991 | 2/1970 |
| GB | 1296994 A | 11/1972 |
| GB | 2144688 | 3/1985 |
| WO | WO0224530 | 3/2002 |
| WO | WO0247976 | 6/2002 |
| WO | WO2004005132 | 1/2004 |
| WO | WO2010101699 | 9/2010 |
| WO | WO2011011161 | 1/2011 |

OTHER PUBLICATIONS

U.S. Appl. No. 12/410,865, filed Mar. 25, 2009, Kutzmann.
U.S. Appl. No. 12/410,880, filed Mar. 25, 2009, Kutzmann et al.
U.S. Appl. No. 12/410,894, filed Mar. 25, 2009, Kutzmann et al.
U.S. Appl. No. 12/410,820, filed Mar. 25, 2009, Vessberg et al.
U.S. Appl. No. 29/325,636, filed Oct. 3, 2008, Kutzmann et al.
U.S. Appl. No. 12/410,813, filed Mar. 25, 2009, Kutzmann et al.
U.S. Appl. No. 12/410,828, filed Mar. 25, 2009, Kutzmann et al.
U.S. Appl. No. 12/398,951, filed Mar. 5, 2009, Grip.

* cited by examiner

SHAPE-CHANGING CONTROL SURFACE

BACKGROUND INFORMATION

1. Field

The present disclosure relates generally to aircraft and, in particular, to a method and apparatus for controlling movement of an aircraft. Still more particularly, the present disclosure relates to a method and apparatus for changing the shape of a control surface for an aircraft.

2. Background

An aircraft is a vehicle capable of flying through the atmosphere. Types of aircraft may include, for example, fixed-wing aircraft and rotorcraft. The flight of an aircraft may be controlled by a number of flight control surfaces. A flight control surface is a part of the surface of an aircraft used to control the aerodynamic performance of an aircraft. A flight control surface may be used to control the attitude of an aircraft. The shape and/or position of flight control surfaces may generate lift, control stability, change direction, change drag, and/or change other relevant aerodynamic parameters for an aircraft.

More specifically, flight control surfaces on an aircraft are used to change the direction of an aircraft around three axes. These axes include a vertical axis, a longitudinal axis, and a lateral axis. A vertical axis passes through an aircraft from top to bottom. Rotation or movement about this axis is referred to as yaw. Yaw changes the direction of the nose of an aircraft pointing it to the left or right. The longitudinal axis passes through the aircraft from the nose to the tail. Rotation about this axis is referred to as bank or roll. The lateral axis passes from one wing tip of an aircraft to another wing tip of the aircraft. Rotation about this axis is referred to as pitch.

Control surfaces may include, for example, without limitation, ailerons, elevators, rotors, trims, rudders, spoilers, flaps, slats, thrust reversers, and/or other suitable control surfaces. Different control surfaces may be attached to an airfoil to provide different axes of motion for the aircraft. An airfoil may be, for example, a wing or blade of an aircraft. Control surfaces may be used to optimize the aerodynamic surfaces of an airfoil.

For example, a flap may be located at a trailing edge of an airfoil in the form of a wing. A flap is an extension to the trailing edge of a wing to provide lift augmentation as well as drag augmentation. Further, deployment of a flap may reduce the stalling speed for an aircraft by altering airflow over the wing. Flap deployment may allow an aircraft to climb and/or descend at a steeper angle without an increase in speed. Movement of this type of control surface, as well as other control surfaces, during flight may be performed to maximize the handling and performance of the aircraft.

The degree of flow turning for a control surface is the degree at which airflow over a wing may be turned or deflected with respect to the original direction of airflow. The degree of flow turning may be defined with respect to the undeflected upper surface of the control surface. For example, the deployment of a flap may cause the airflow over a wing during flight to be deflected at some downward angle with respect to the original direction of airflow. The degree of flow turning may be achieved by changing the shape of the control surface.

Currently, existing control surfaces include extension and/or unfolding mechanisms that have protrusions. For example, currently used flap systems may have fittings which protrude into the airstream on a second side of a wing. Some existing control surfaces may use sliding joints to lengthen the first side of a control surface and shorten the second side of a control surface during deployment of the control surface. Further, some control surfaces may also use a sliding joint at the tip of a control surface. These control surfaces may have inadequate strength, may be heavy, and/or may be expensive.

The types of changes to the shape of a control surface that may be made with existing flight control surfaces may be limited and may not provide desired aerodynamic performance. For example, existing flap systems do not allow for a high degree of flow turning. A high degree of flow turning may be around at least 50 degrees inclined to the horizontal plane of the aircraft.

Therefore, it would be advantageous to have a method and apparatus that addresses at least some of the issues discussed above and possibly other issues.

SUMMARY

In one advantageous embodiment, an apparatus comprises a flexible skin, a skin associated with the flexible skin, a structure located between the flexible skin and the skin, and an assembly. The skin is located substantially opposite of the flexible skin. The assembly is movably connected to the structure and is configured to move such that the flexible skin changes between a plurality of curvatures.

In another advantageous embodiment, a method is present for controlling the shape of a control surface. A structure is rotated about an axis. The structure is located between a flexible skin and a skin located substantially opposite of the flexible skin. An assembly is moved to change the shape of the control surface in response to a rotation of the structure. The assembly is movably connected to the structure and is configured to move such that the flexible skin forms a plurality of curvatures.

The features, functions, and advantages can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the advantageous embodiments are set forth in the appended claims. The advantageous embodiments, however, as well as a preferred mode of use, further objectives and advantages thereof, will best be understood by reference to the following detailed description of an advantageous embodiment of the present disclosure when read in conjunction with the accompanying drawings, wherein:

DETAILED DESCRIPTION

Figure 1:
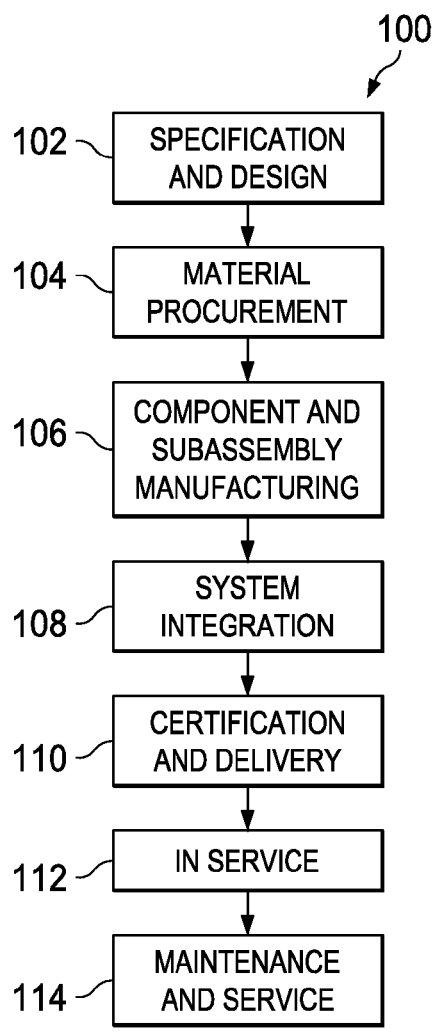
FIG. 1 is a diagram illustrating an aircraft manufacturing and service method in accordance with an advantageous embodiment.
Figure 2:
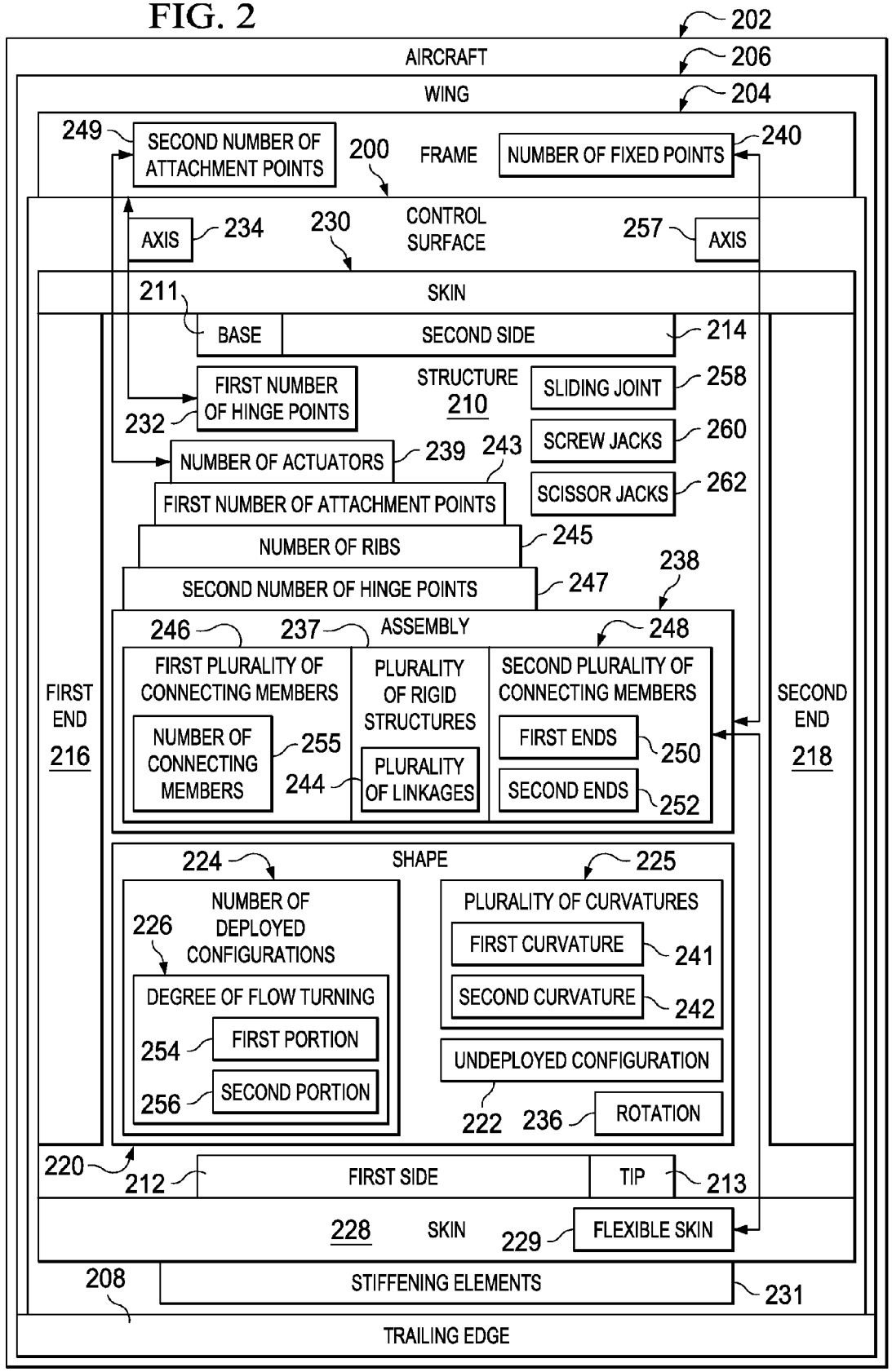
FIG. 2 is a block diagram of an aircraft with a control surface in which an advantageous embodiment may be implemented.

Referring more particularly to the drawings, embodiments of the disclosure may be described in the context of aircraft manufacturing and service method 100 as shown in FIG. 1 and aircraft 202 as shown in FIG. 2. Turning first to FIG. 1, a diagram illustrating an aircraft manufacturing and service method is depicted in accordance with an advantageous embodiment. During pre-production, aircraft manufacturing and service method 100 may include specification and design 102 of aircraft 202 in FIG. 2 and material procurement 104.

During production, component and subassembly manufacturing 106 and system integration 108 of aircraft 202 in FIG. 2 takes place. Thereafter, aircraft 202 in FIG. 2 may go through certification and delivery 110 in order to be placed in service 112. While in service by a customer, aircraft 202 in FIG. 2 is scheduled for routine maintenance and service 114, which may include modification, reconfiguration, refurbishment, and other maintenance or service.

Each of the processes of aircraft manufacturing and service method 100 may be performed or carried out by a system integrator, a third party, and/or an operator. In these examples, the operator may be a customer. For the purposes of this description, a system integrator may include, without limitation, any number of aircraft manufacturers and major-system subcontractors; a third party may include, without limitation, any number of venders, subcontractors, and suppliers; and an operator may be an airline, leasing company, military entity, service organization, and so on.

Apparatus and methods embodied herein may be employed during at least one of the stages of aircraft manufacturing and service method 100 in FIG. 1. As used herein, the phrase "at least one of", when used with a list of items, means that different combinations of one or more of the listed items may be used and only one of each item in the list may be needed. For example, "at least one of item A, item B, and item C" may include, for example, without limitation, item A, or item A and item B. This example also may include item A, item B, and item C, or item B and item C.

In one illustrative example, components or subassemblies produced in component and subassembly manufacturing 106 in FIG. 1 may be fabricated or manufactured in a manner similar to components or subassemblies produced while aircraft 202 is in service 112 in FIG. 1. As yet another example, a number of apparatus embodiments, method embodiments, or a combination thereof may be utilized during production stages, such as component and subassembly manufacturing 106 and system integration 108 in FIG. 1.

A number of, when referring to items, means one or more items. For example, a number of apparatus embodiments is one or more apparatus embodiments. A number of apparatus embodiments, method embodiments, or a combination thereof may be utilized while aircraft 202 is in service 112 and/or during maintenance and service 114 in FIG. 1. For example, control surfaces according to different advantageous embodiments may be implemented or used during a number of these stages. The use of a number of the different advantageous embodiments may substantially expedite the assembly of and/or reduce the cost of aircraft 202.

The different advantageous embodiments take into account and recognize a number of different considerations. For example, the different advantageous embodiments take into account and recognize that it may be desirable to have a control surface that may quickly change shape. A control surface with a high degree of flow turning for an aircraft is often desirable. For example, a control surface that is straight in an undeployed configuration and curved in a deployed configuration may be desirable. The curved shape of the control surface is capable of providing a high degree of flow turning.

The different advantageous embodiments also recognize and take into account that a control surface that curves smoothly such that there are no sharp discontinuities and/or gaps on the first side of the control surface may be desirable. Further, a control surface without protrusions in the mold line of the control surface or the airfoil with which the control surface is associated may provide improved performance and/or airflow and may also be beneficial with respect to low-observable considerations, such as with stealth aircraft.

The different advantageous embodiments also recognize and take into account that currently used systems may use sliding joints for both the first side and the second side of a control surface. These systems also may use a sliding joint at the tip of the control surface. However, a control surface without a sliding joint at the tip to improve the stiffness of the tip section of the control surface is desirable in some instances.

Turning now to FIG. 2, a block diagram of an aircraft with a control surface is depicted in which an advantageous embodiment may be implemented. In these illustrative examples, control surface 200 is one example of a control surface that may be implemented in aircraft 202. Control surface 200 may be manufactured as part of aircraft 202 during component and subassembly manufacturing 106 in FIG. 1. In other examples, control surface 200 may replace a currently used control surface for aircraft 202 during maintenance and service 114 in FIG. 1.

In these illustrative examples, control surface 200 is associated with frame 204 of wing 206. In the different advantageous embodiments, a first component may be associated with a second component by being attached to, connected to, bonded to, welded to, fastened to, part of, manufactured with, and/or otherwise associated with the second component. In these depicted examples, control surface 200 is attached to frame 204 at trailing edge 208 of wing 206.

Frame 204 includes a number of structural components. These components may include, for example, without limitation, spars, ribs, and/or other structural components. As used herein, "a number of" items refers to one or more items. For example, a number of structural components means one or more structural components.

In these illustrative examples, structure 210 of control surface 200 is comprised of various members. For example, without limitation, structure 210 may comprise rods, joints, linkages, spars, ribs, beams, panels, and/or other suitable structural components. Structure 210 has base 211, tip 213, first side 212, second side 214, first end 216, and second end 218. Base 211 may be a leading edge of control surface 200 in these examples.

In these illustrative examples, structure 210 has shape 220. Shape 220 may be, for example, a straight shape, a curved shape, and/or some other suitable shape for structure 210. Shape 220 changes as structure 210 is moved between undeployed configuration 222 and number of deployed configurations 224. In undeployed configuration 222, shape 220 is a straight shape in these depicted examples. In other examples, shape 220 may be a curved shape in undeployed configuration 222. In number of deployed configurations 224, shape 220 may be any of a number of curved shapes of varying degrees of curvature.

In these illustrative examples, number of deployed configurations 224 allows for a range of degrees of flow turning. For example, number of deployed configurations 224 provides degree of flow turning 226. In these examples, degree of flow turning 226 is the angle at which air flowing over wing 206 is deflected to flow over control surface 200. Further, degree of flow turning 226 is measured with respect to the deflected position of tip 213 in number of deployed configurations 224, as compared to the undeflected position of tip 213 in undeployed configuration 222.

Number of deployed configurations 224 for control surface 200 may be based on the range of degree of flow turning 226. For example, control surface 200 may allow around a 30 degree angle of flow turning with one deployed configuration, and around a 60 degree angle of flow turning with a second deployed configuration.

In these illustrative examples, control surface 200 has skin 228 attached to first side 212 of structure 210 and skin 230 attached to second side 214 of structure 210. Skin 228 is associated with skin 230. Further, skin 228 may be located substantially opposite to skin 230. Skin 228 and skin 230 extend from base 211 to tip 213 and from first end 216 to second end 218.

Skin 228 and skin 230 may be formed from one or more skin panels. These skins may be made out of materials such as, for example, without limitation, metal, corrugated metal, ceramic, titanium, aluminum, composite skin, and/or some other suitable material. Further, skin 228 and/or skin 230 may be comprised of a material capable of bending. In these illustrative examples, skin 228 is comprised of a material that can curve.

For example, skin 228 may be flexible skin 229. Flexible skin 229 curves in number of deployed configurations 224 to form degree of flow turning 226. Further, flexible skin 229 curves to provide plurality of curvatures 225 for undeployed configuration 222 and each of number of deployed configurations 224. In these illustrative examples, plurality of curvatures 225 contributes to shape 220 of structure 210. For example, flexible skin 229 with around 0 degrees of curvature gives structure 210 a substantially straight shape. Flexible skin 229 with around 30 degrees of curvature gives structure 210 a curved shape.

In these illustrative examples, control surface 200 has stiffening elements 231 attached to flexible skin 229. Stiffening elements 231 may be capable of increasing the stiffness of flexible skin 229 in a spanwise direction in a number of sections in flexible skin 229, while allowing flexible skin 229 to remain flexible in the chordwise direction. Stiffening elements 231 may be made out of materials such as, for example, without limitation, aluminum, titanium, fiber-reinforced composites, other metals, and/or other suitable materials.

Stiffening elements 231 may be metal stiffeners attached to flexible skin 229 along the span of control surface 200 to provide stiffness in the spanwise direction. In the illustrative example, a spanwise direction refers to the direction from first end 216 to second end 218. In some advantageous embodiments, stiffening elements 231 may be embedded within flexible skin 229 or added to flexible skin 229 during its construction. For example, stiffening elements 231 may be machined as part of flexible skin 229.

In these illustrative examples, control surface 200 further comprises first number of hinge points 232. First number of hinge points 232 may be located on structure 210. For example, first number of hinge points 232 may be located at or around base 211 of control surface 200. First number of hinge points 232 connects structure 210 to frame 204. These hinge points allow structure 210 to be configured to move around axis 234 through first number of hinge points 232. This movement may be rotation 236 in degrees.

Number of actuators 239 is connected to structure 210 at first number of attachment points 243 located on number of ribs 245 and is connected to frame 204 at second number of attachment points 249 located on frame 204. Number of actuators 239 is configured to rotate structure 210 around axis 234 in these examples. The actuators used, in these examples, may be hydraulic linear actuators. However, in other advantageous embodiments, other types of actuators may be used. These actuators include, for example, without limitation, linear motor actuators, electro-mechanical actuators, piezoelectric actuators, and/or other types of actuators.

In these illustrative examples, control surface 200 has assembly 238. Assembly 238 is movably connected to structure 210. Assembly 238 is connected to structure 210 at number of fixed points 240 on frame 204. Further, assembly 238 is configured to move to allow flexible skin 229 to change between plurality of curvatures 225. In other words, as structure 210 rotates about axis 234, assembly 238 moves to change shape 220 of structure 210.

Changes between plurality of curvatures 225 allow flexible skin 229 to change degree of flow turning 226. For example, without limitation, first curvature 241 may be formed with undeployed configuration 222, and second curvature 242 may be formed with one of number of deployed configurations 224.

In these illustrative examples, assembly 238 comprises plurality of rigid structures 237. Plurality of rigid structures 237 may be any rigid structures capable of rotating around some point associated with the structure. For example, these rigid structures may be linkages, plates, panels, and/or some other suitable type of structure. In these illustrative examples, plurality of rigid structures 237 takes the form of plurality of linkages 244.

Plurality of linkages 244 are connected to structure 210. For example, plurality of linkages 244 are connected to number of ribs 245 of structure 210 at second number of hinge points 247 located on number of ribs 245. Plurality of linkages 244 is rotatable about second number of hinge points 247. Further, plurality of linkages 244 are connected in series to number of fixed points 240 on frame 204. These linkages are connected in series with number of fixed points 240 by first plurality of connecting members 246. In these illustrative examples, number of fixed points 240 may not be located on structure 210.

In these examples, second plurality of connecting members 248 connects plurality of linkages 244 to flexible skin 229. Second plurality of connecting members 248 may have first ends 250 movably connected to plurality of linkages 244 and second ends 252 connected to flexible skin 229.

As structure 210 rotates about axis 234, number of connecting members 255 within first plurality of connecting members 246 may move. In these examples, this movement of number of connecting members 255 may be around axis 257 formed by number of fixed points 240. Movement of number of connecting members 255 may cause movement of plurality of linkages 244. Movement of plurality of linkages 244 may cause second plurality of connecting members 248 to change flexible skin 229 from first curvature 241 to second curvature 242.

In this manner, both rotation 236 of structure 210 about axis 234 and changes in the curvature of flexible skin 229 change degree of flow turning 226. In other words, rotation 236 of structure 210 about axis 234 causes first portion 254 of degree of flow turning 226. Changes in the curvature of flexible skin 229 cause second portion 256 of degree of flow turning 226.

In these illustrative examples, the different connecting members for control surface 200 are configured to provide a desired amount of curvature for flexible skin 229 in response to a certain amount of rotation 236. For example, the lengths of the connecting members and the configuration of the linkages of assembly 238 may be selected such that first portion 254 and second portion 256 of degree of flow turning 226 are substantially the same with respect to each other.

In these illustrative examples, sliding joint 258 is located around base 211 of control surface 200. As flexible skin 229 curves, sliding joint 258 may be configured to allow flexible skin 229 to slide relative to skin 230. In other words, sliding joint 258 allows a surface of flexible skin 229 to slide relative to a surface of skin 230. Further, sliding joint 258 may be configured to allow flexible skin 229 and/or skin 230 to slide relative to frame 204 of wing 206.

The illustration of control surface 200 in FIG. 2 is not meant to imply physical or architectural limitations to the manner in which control surfaces may be implemented. Other components in addition to, or in place of, the ones illustrated may be used in some advantageous embodiments. Some components illustrated in control surface 200 may be omitted in some advantageous embodiments.

Control surface 200 may take the form of, for example, a flap, a rudder, an elevator, or some other suitable type of controls surface. In some advantageous embodiments, control surface 200 may be associated with a leading edge of a structure of aircraft 202. For example, control surface 200 may be a changeable slat connected to the leading edge of a wing of aircraft 202. In still other advantageous embodiments, control surface 200 may be associated with a platform other than aircraft 202. For example, control surface 200 may be associated with a submarine, a spacecraft, and/or some other suitable platform.

In some advantageous embodiments, plurality of rigid structures 237 may be a plurality of metal plates that are rotatable about second number of hinge points 247. In other advantageous embodiments, plurality of linkages 244 may be connected to structure 210 at structures and/or components other than number of ribs 245. In other words, second number of hinge points 247 may be located on structures and/or components other than number of ribs 245. For example, second number of hinge points 247 may be located on a number of beams, a number of rods, a number of panels, and/or some other suitable component of structure 210.

The connecting members used for connecting plurality of linkages 244 to structure 210 and flexible skin 229 may take various forms. For example, without limitation, the connecting members may be rods, tubes, beams, elongate members, segments, and/or other suitable types of members capable of connecting components or parts. Further, the connecting members used in assembly 238 may have different types of cross sections. The cross sections may be, for example, without limitation, rectangular, square, circular, oval, hollow, solid, irregular, and/or some other suitable type of cross section.

In some advantageous embodiments, control surface 200 may use screw jacks 260, scissor jacks 262, and/or some other suitable device in the place of number of actuators 239. Of course, compared to these other systems, actuators may allow for faster response times. In some advantageous embodiments, skin 230 may also be a flexible skin.

Figure 3:
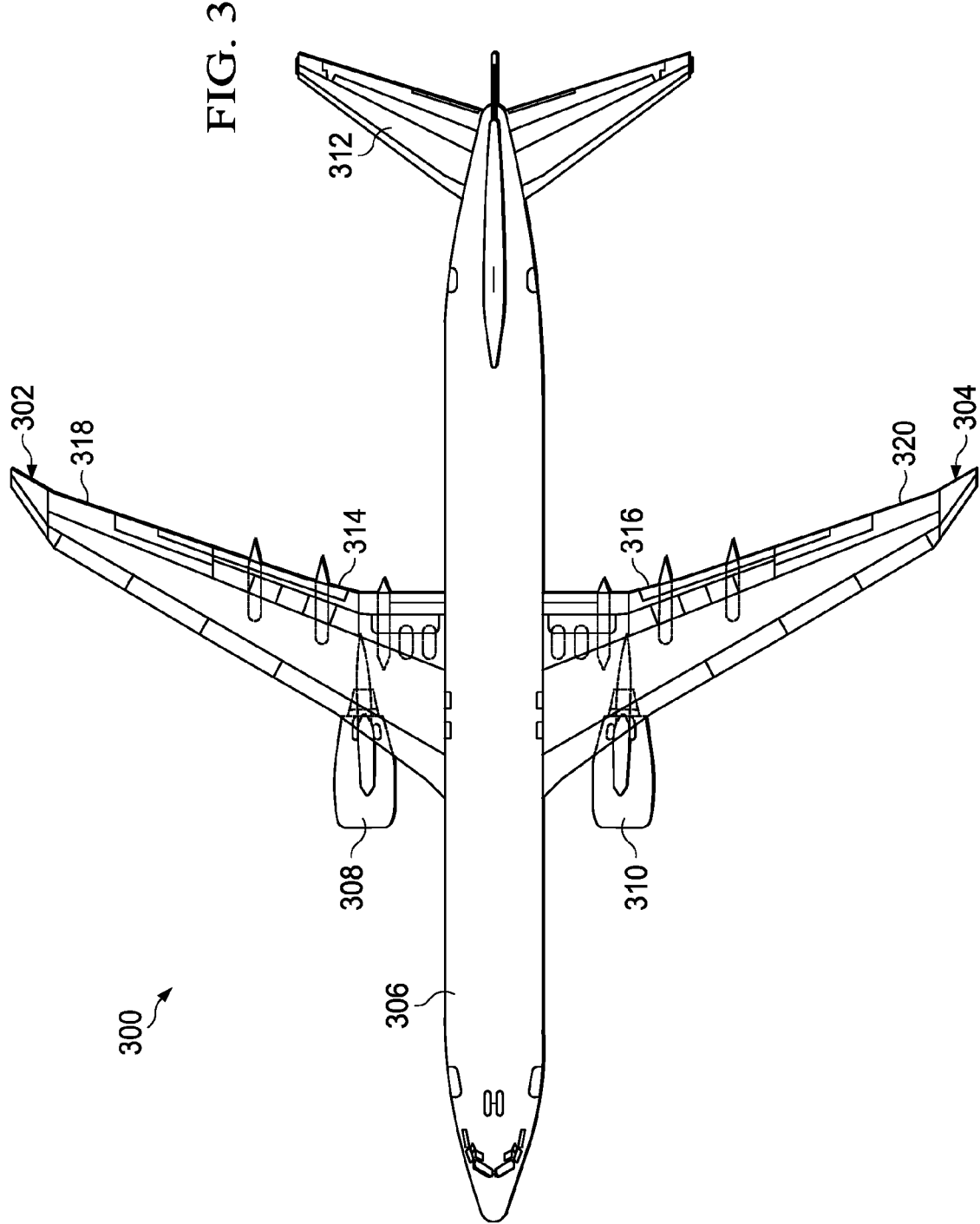
FIG. 3 is a diagram of an aircraft in which an advantageous embodiment may be implemented.

With reference now to FIG. 3, a diagram of an aircraft is depicted in which an advantageous embodiment may be implemented. Aircraft 300 is an example of an aircraft in which a control surface such as, for example, without limitation, control surface 200 in FIG. 2 may be implemented.

In this illustrative example, aircraft 300 has wings 302 and 304 attached to body 306. Aircraft 300 includes wing-mounted engine 308, wing-mounted engine 310, and tail 312. Further, wings 302 and 304 have flaps 314 and 316, respectively, attached to and/or located on trailing edges 318 and 320 of wings 302 and 304, respectively. In this illustrative example, flaps 314 and 316 may be examples of control surface 200 in FIG. 2. In other advantageous embodiments, aircraft 300 may take the form of a different type of aircraft. For example, aircraft 300 may take the form of a stealth aircraft, such as an F-117, F-22, B-2, F-35, or some other suitable type of aircraft.

With reference now to FIGS. 4-12, a control surface that can change shape is depicted in accordance with an advantageous embodiment. In these illustrative examples, the control surface is a flap that can change shape.

Figure 4:
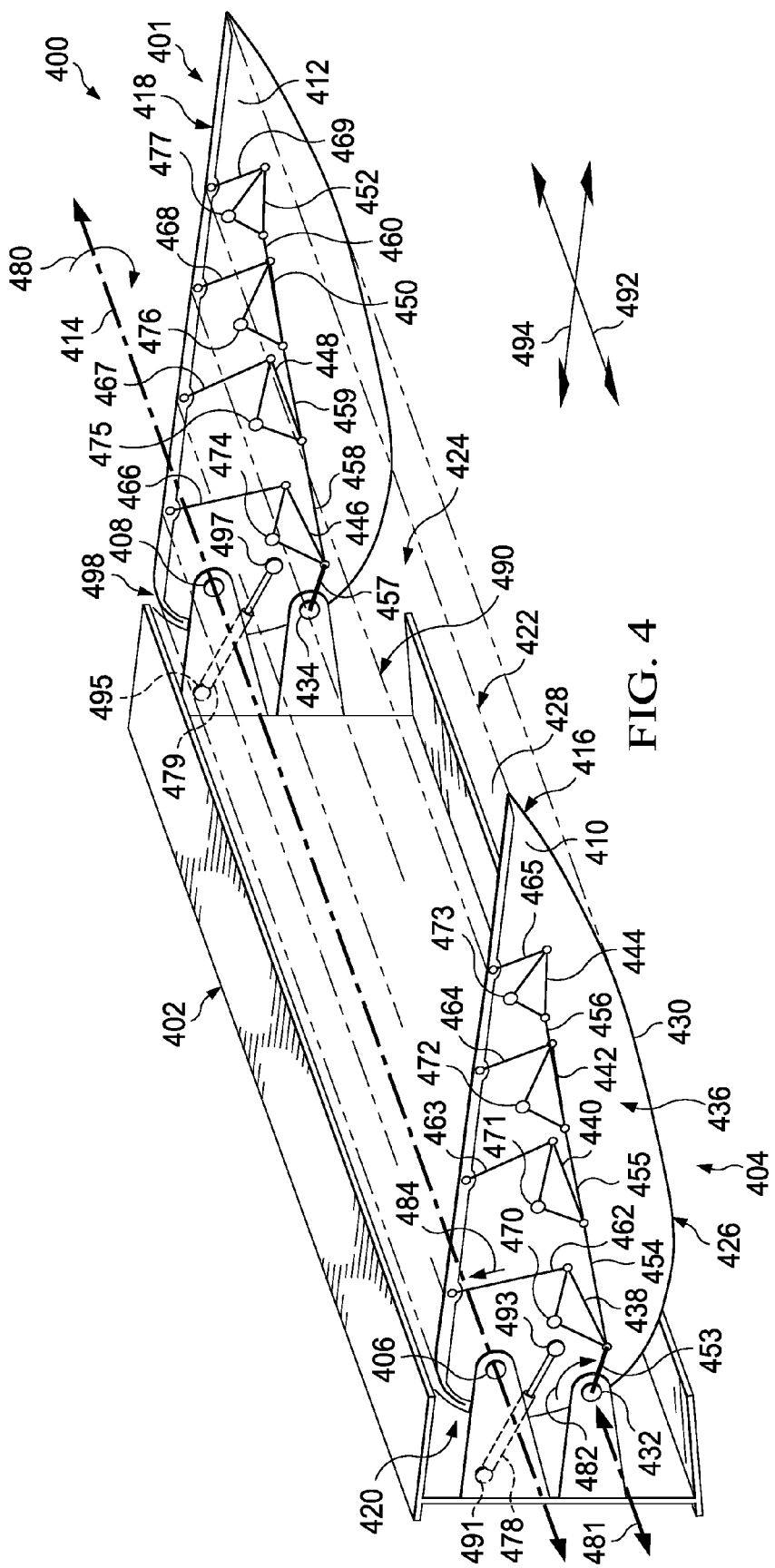
FIG. 4 is an illustration of a flap in an undeployed configuration in accordance with an advantageous embodiment.

Turning to FIG. 4, an illustration of a flap in an undeployed configuration is depicted in accordance with an advantageous embodiment. In these illustrative examples, flap 400 is shown in a perspective view and is one example of one implementation for control surface 200 in FIG. 2.

Flap 400 is seen in undeployed configuration 401 in this depicted example. Flap 400 is attached to frame 402. Frame 402 may be a frame of a wing such as, for example, frame 204 of wing 206 in FIG. 2.

Flap 400 has structure 404 attached to frame 402 at hinge points 406 and 408. Hinge points 406 and 408 may be located on ribs 410 and 412 of structure 404, respectively. In these illustrative examples, hinge points 406 and 408 form axis 414. Structure 404 may rotate about axis 414 in these examples.

In these illustrative examples, rib 410 is located at first end 416 of structure 404, and rib 412 is located at second end 418 of structure 404. Further, structure 404 also has base 420, tip 422, first side 424, and second side 426. Base 420 may be the leading edge of flap 400. In these examples, flexible skin 428 is attached to first side 424 of structure 404, and skin 430 is attached to second side 426. Flexible skin 428 and skin 430 may be located substantially opposite to each other. Further, flexible skin 428 and skin 430 extend from base 420 to tip 422 and from first end 416 to second end 418 in these examples. As depicted in this example, flexible skin 428 has a substantially straight shape in undeployed configuration 401.

In these depicted examples, flap 400 has assembly 436 connected to frame 402 at fixed points 432 and 434. Fixed points 432 and 434 are fixed against translation. Fixed points 432 and 434 are not directly connected to structure 404 in these examples. In other words, fixed points 432 and 434 are fixed with respect to frame 402.

Assembly 436 is comprised of linkages 438, 440, 442, and 444 located at first end 416 of structure 404 and linkages 446, 448, 450, and 452 located at second end 418. As depicted in these examples, the linkages at first end 416 are movably connected in series to fixed point 432 by connecting members 453, 454, 455, and 456. The linkages at second end 418 are movably connected in series to fixed point 434 by connecting members 457, 458, 459, and 460.

Further, linkages 438, 440, 442, and 444 are connected to flexible skin 428 by connecting members 462, 463, 464, and 465, respectively. Linkages 446, 448, 450, and 452 are connected to flexible skin 428 by connecting members 466, 467, 468, and 469, respectively. In these examples, connecting members 462, 463, 464, and 465 are movable around the attachment points of these connecting members to flexible skin 428 in around substantially the same plane of rib 410. In a similar manner, connecting members 466, 467, 468, and 469 are movable around the attachment points of these connecting members to flexible skin 428 in around substantially the same plane of rib 412.

As depicted in these examples, linkages 438-452 are movable linkages. These linkages are comprised of three connecting members that are configured in a triangular shape. These connecting members have fixed lengths. In other advantageous embodiments, each linkage may have a different number of connecting members configured in a different shape.

In these illustrative examples, these linkages each have a hinge point. Linkages 438-452 are attached to structure 404 by being attached to ribs 410 and 412 at these hinge points. For example, linkages 438-444 are attached to rib 410 at hinge points 470, 471, 472, and 473, respectively. Linkages 446-452 are attached to rib 412 at hinge points 474, 475, 476, and 477, respectively. These hinge points are stationary points on ribs 410 and 412 around which the linkages may move.

In these depicted examples, actuator 478 and actuator 479 attach to rib 410 and rib 412, respectively, to connect structure 404 to frame 402. Actuator 478 attaches to frame 402 at attachment point 491 and to rib 410 at attachment point 493. Actuator 479 attaches to frame 402 at attachment point 495 and to rib 412 at attachment point 497. Shortening of these actuators causes movement of structure 404 in the direction of arrow 480. This movement may be a rotation around axis 414. As structure 404 moves, assembly 436 connected to structure 404 also moves.

For example, as structure 404 rotates about axis 414, connecting member 453 rotates about axis 481 through fixed points 432 and 434. This rotation may be in the direction of arrow 482. Further, this rotation of connecting member 453 causes rotation of linkage 438 about hinge point 470. In other words, connecting member 453 acts as a restraint at fixed point 432 pulling linkage 438 about hinge point 470 to change the angles of linkage 438 in response to rotation of linkage 438 about hinge point 470.

In these depicted example, movement of linkage 438 may cause movement of connecting member 462 in the direction of arrow 484. With hinge point 470 being a stationary attachment point on rib 410, movement of connecting member 462 in the direction of arrow 484 causes connecting member 462 to push against flexible skin 428. This pushing may cause flexible skin 428 to curve at the attachment point of connecting member 462 to flexible skin 428.

In these examples, the series connection of linkages 438-444 is configured for movement of linkage 438 to cause movement of linkages 440-444 in a manner similar to linkage 438. Further, rotation of structure 404 about axis 414 may cause similar movement of assembly 436 and linkages 446-452 at second end 418.

In these illustrative examples, flap 400 may have stiffening elements 490 attached to flexible skin 428. Stiffening elements 490 allow flexible skin 428 to be stiff in spanwise direction 492 but flexible in chordwise direction 494. In other words, stiffening elements 490 allow flexible skin 428 to be stiff in spanwise direction 492 with curving of flexible skin 428. Further, as flexible skin 428 curves, flexible skin 428 and skin 430 may slide along each other at sliding joint 498.

In these advantageous embodiments, undeployed configuration 401 provides around 0 degrees of flow turning. In other words, the straight shape of flexible skin 428 in undeployed configuration 401 causes air to flow over flap 400 in the same direction and at the same angle as over frame 402 of the wing.

Figure 5:
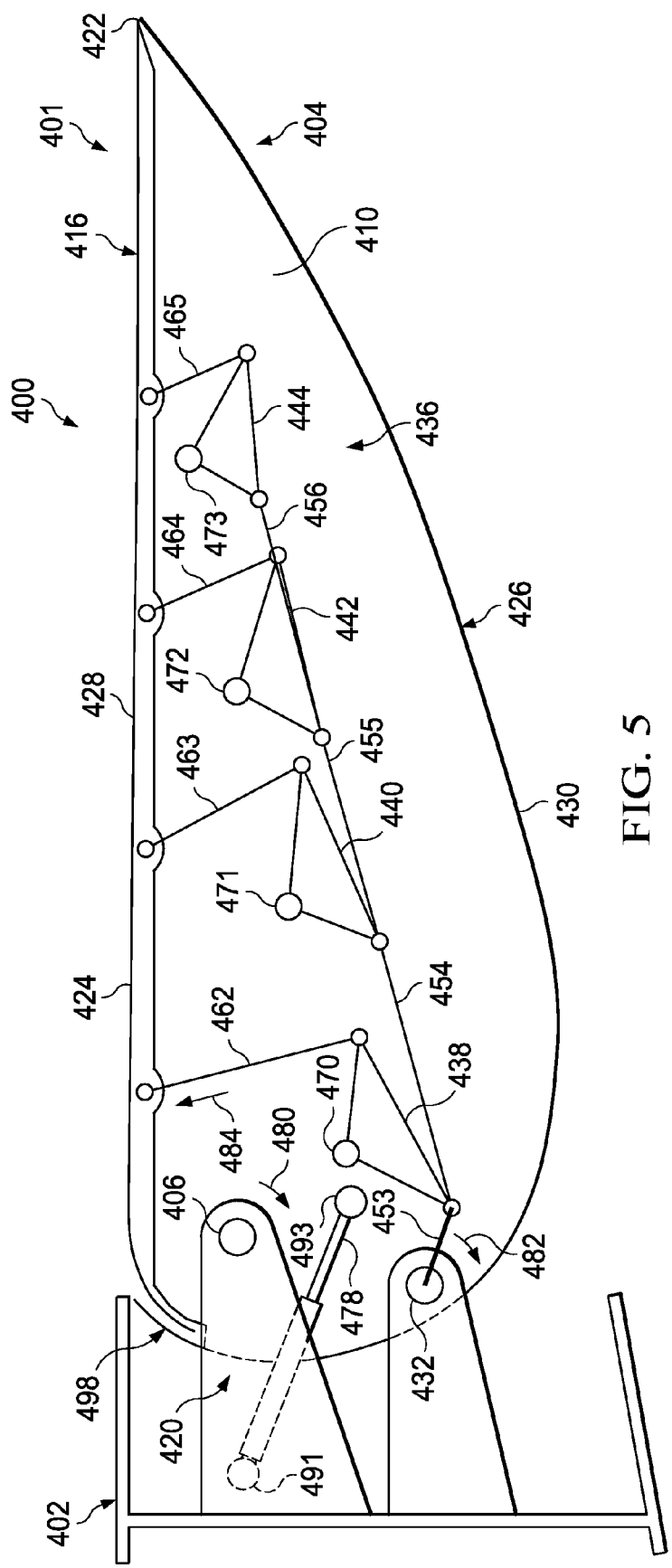
FIG. 5 is an illustration of an end view of a flap in accordance with an advantageous embodiment.

Turning now to FIG. 5, an end view of flap 400 is depicted in accordance with an advantageous embodiment. In this illustrative example, flap 400 is viewed from first end 416 in undeployed configuration 401.

Figure 6:
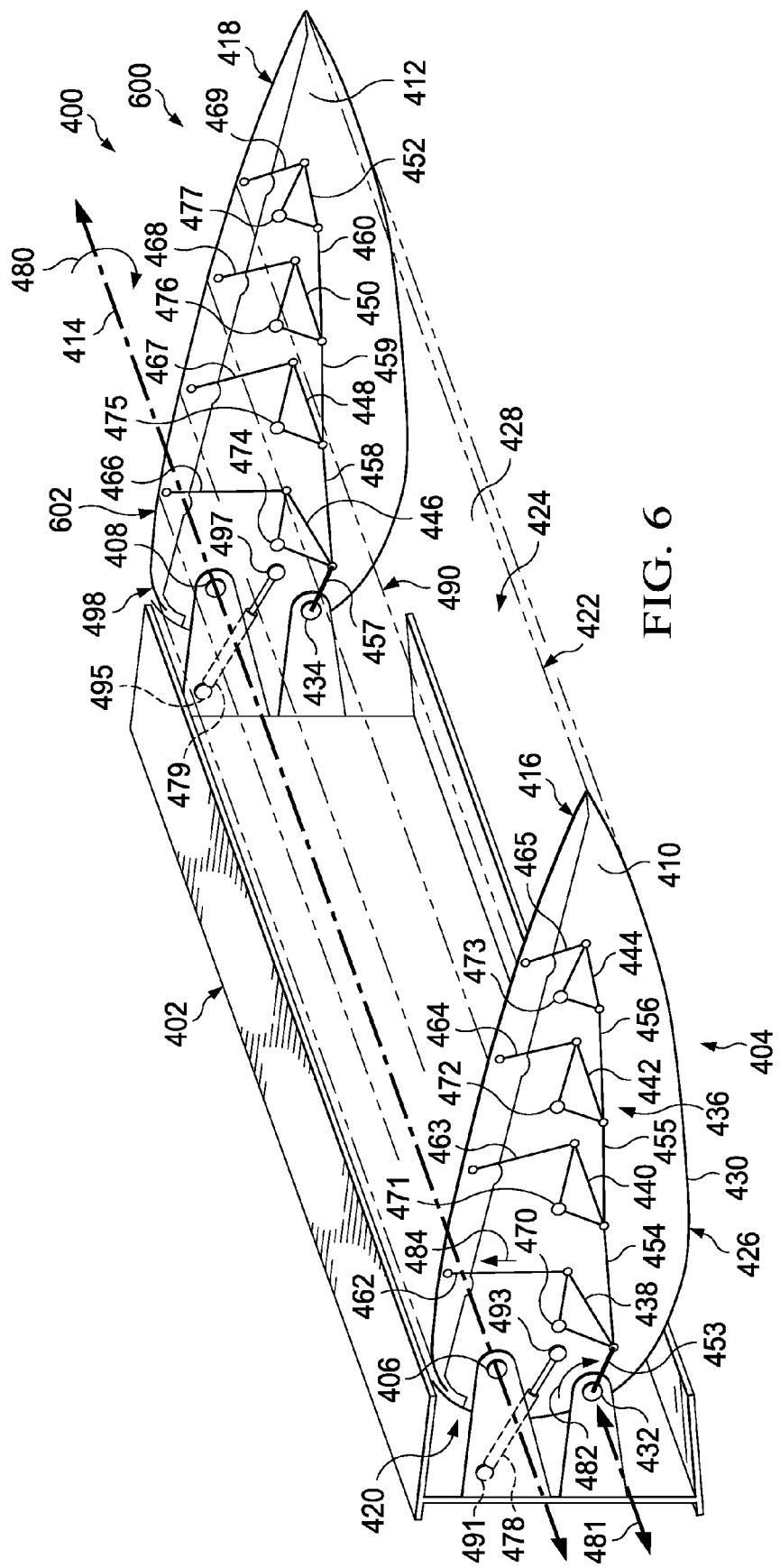
FIG. 6 is an illustration of a flap in a deployed configuration in accordance with an advantageous embodiment.

Turning now to FIG. 6, flap 400 in a deployed configuration is depicted in accordance with an advantageous embodiment. In this illustrative example, flap 400 is in deployed configuration 600. In deployed configuration 600, structure 404 has rotated about axis 414 and flexible skin 428 has curved.

In this illustrative example, actuators 478 and 479 may be activated by a shortening of these actuators. The shortening of actuator 478 and actuator 479 causes rotation of structure 404 about axis 414 in the direction of arrow 480. This rotation, in turn, causes movement of connecting members 453 and 457. The movement of connecting members 453 and 457 causes the linkages of assembly 436 to move in a manner that causes connecting members 462-469 to push against flexible skin 428. A curved shape for flexible skin 428 is formed with curvature 602.

The rotation of structure 404 about axis 414 and the curving of flexible skin 428 each contribute to a portion of a degree of flow turning provided by deployed configuration 600. In these illustrative examples, these two portions may be substantially the same with respect to each other. For example, the rotation of structure 404 may provide around 7.5 degrees of flow turning, and curvature 602 of flexible skin 428 may provide around 7.5 degrees of flow. In this manner, deployed configuration 600 provides around 15 degrees of flow turning for flap 400.

Figure 7:
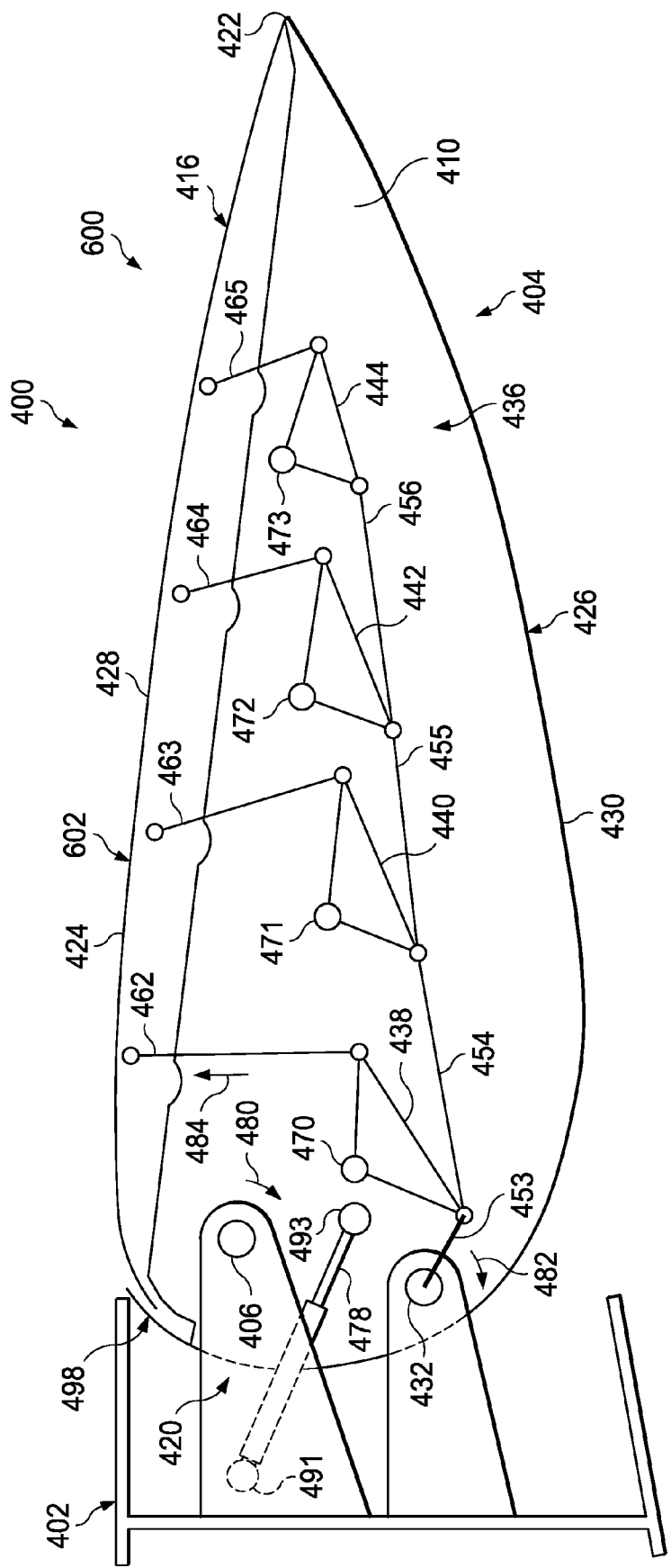
FIG. 7 is an illustration of an end view of a flap in a deployed configuration in accordance with an advantageous embodiment.

Turning now to FIG. 7, an end view of flap 400 in deployed configuration 600 is depicted in accordance with an advantageous embodiment. In this illustrative example, flap 400 is viewed from first end 416 in deployed configuration 600. Flap 400 has a curved shape with curvature 602 for flexible skin 428 and around 15 degrees of flow turning in this example.

Figure 8:
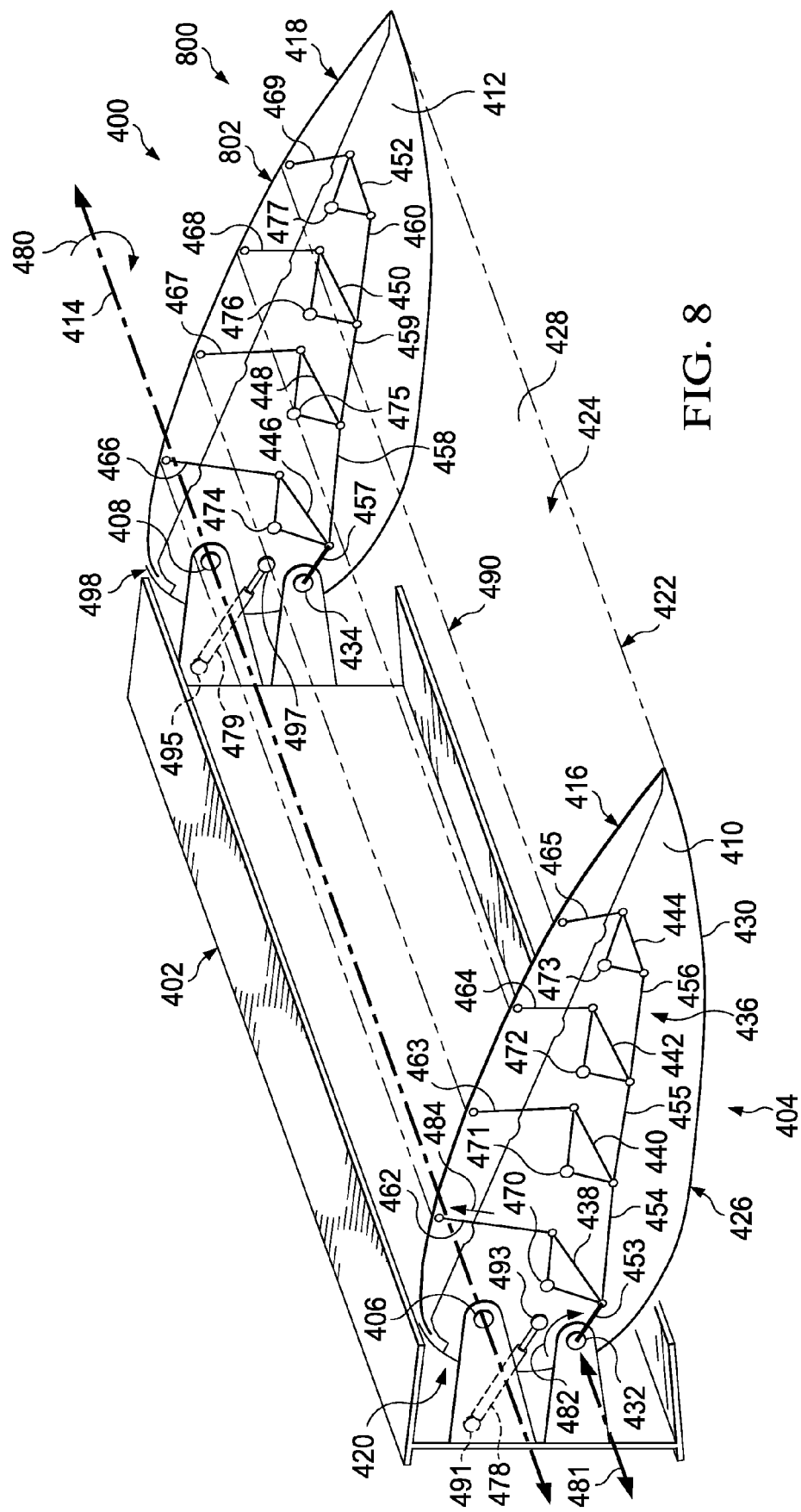
FIG. 8 is an illustration of a flap in a deployed configuration in accordance with an advantageous embodiment.

With reference now to FIG. 8, flap 400 in a deployed configuration is depicted in accordance with an advantageous embodiment. In this illustrative example, flap 400 is in deployed configuration 800. In deployed configuration 800, structure 404 has rotated further about axis 414 and the shape of flexible skin 428 is more curved as compared to deployed configuration 600 in FIGS. 6-7.

In this illustrative example, deployed configuration 800 provides around 30 degrees of flow turning. As depicted, the rotation of structure 404 around axis 414 provides around 15 degrees of flow turning, and curvature 802 of flexible skin 428 provides around 15 degrees of flow turning.

Figure 9:
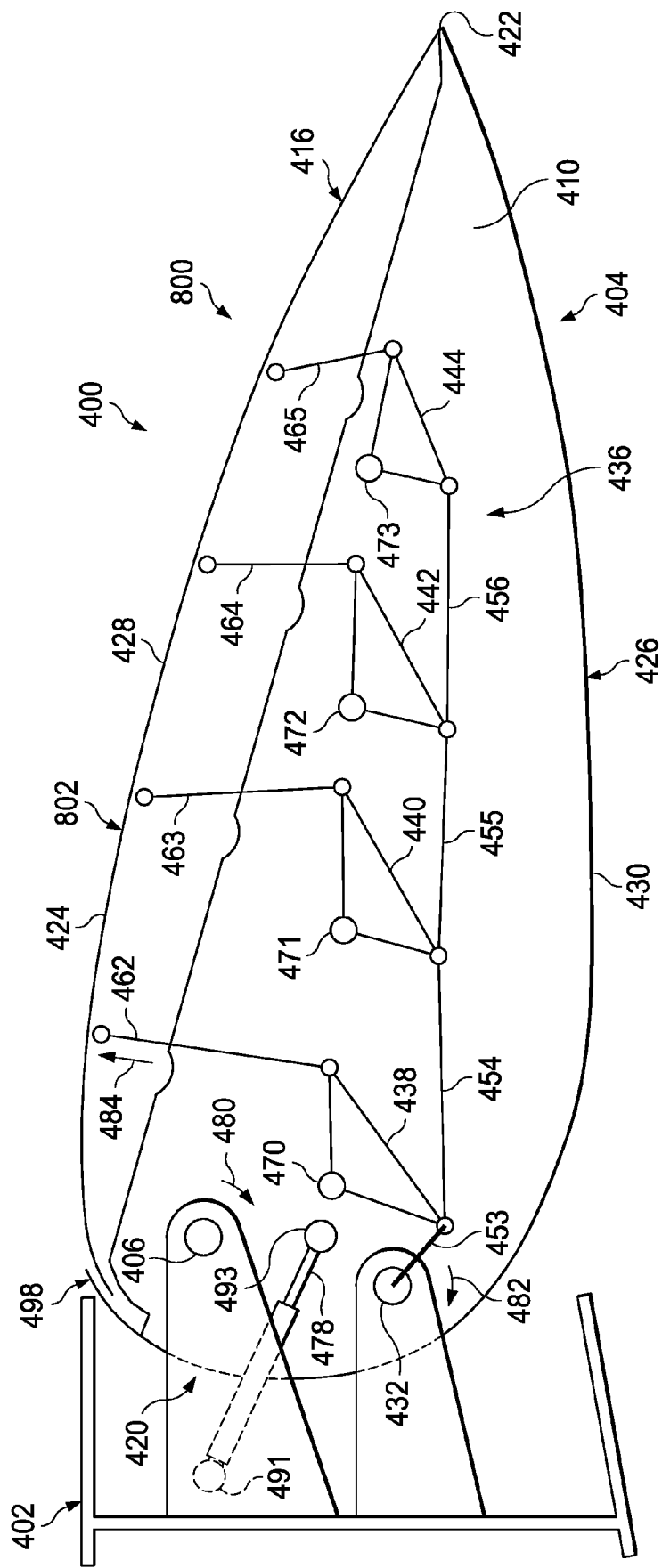
FIG. 9 is an illustration of an end view of a flap in a deployed configuration in accordance with an advantageous embodiment.

Turning now to FIG. 9, an end view of flap 400 in deployed configuration 800 is depicted in accordance with an advantageous embodiment. In this illustrative example, flap 400 is viewed from first end 416 in deployed configuration 800. Flap 400 has a curved shape with curvature 802 for flexible skin 428 and around 30 degrees of flow turning in this example.

Figure 10:
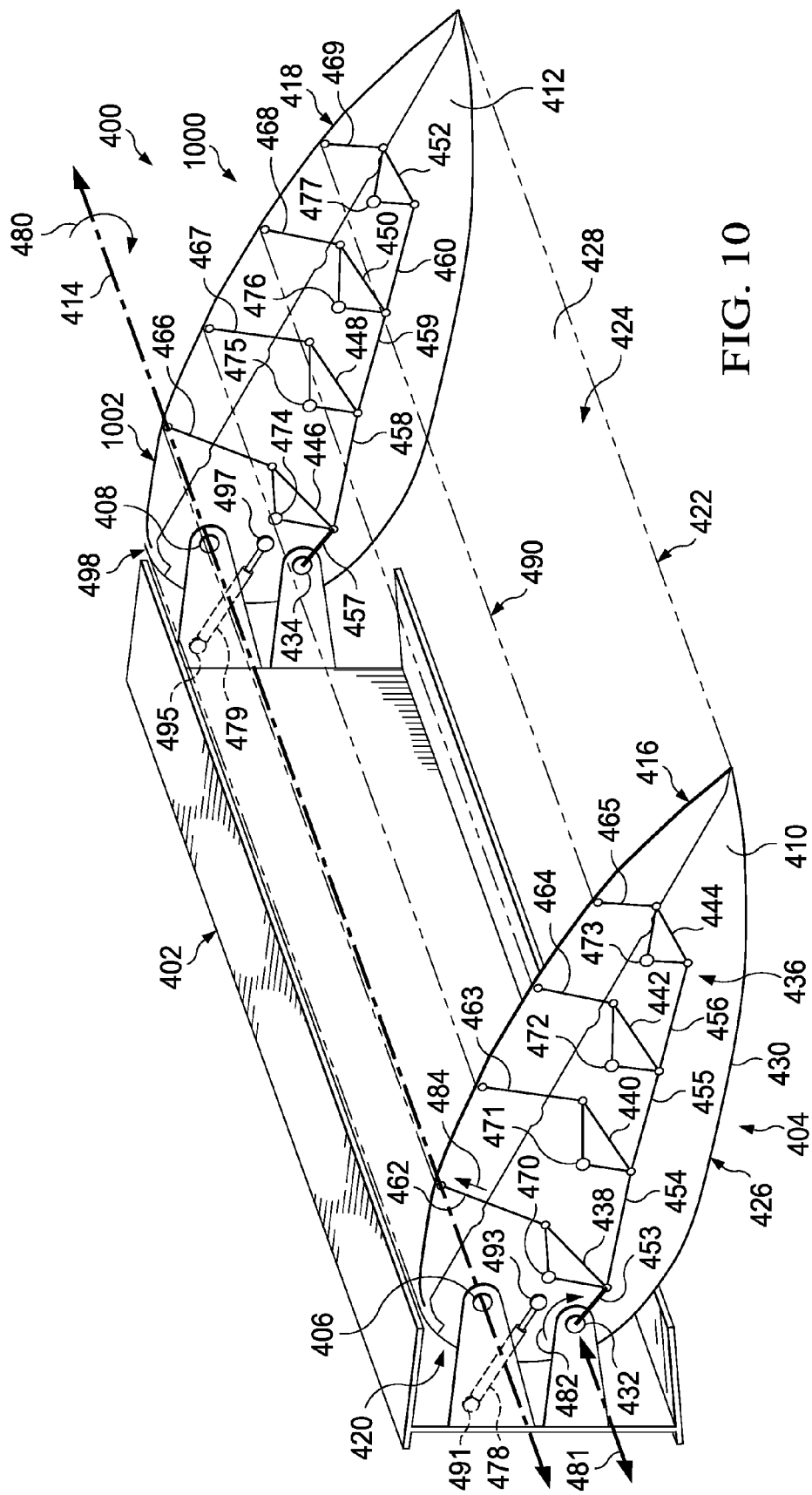
FIG. 10 is an illustration of a flap in a deployed configuration in accordance with an advantageous embodiment.

With reference now to FIG. 10, flap 400 in a deployed configuration is depicted in accordance with an advantageous embodiment. In this illustrative example, flap 400 is in deployed configuration 1000. In deployed configuration 1000, structure 404 has rotated further about axis 414 and the shape of flexible skin 428 is more curved as compared to deployed configuration 800 in FIGS. 8-9.

In this illustrative example, deployed configuration 1000 provides around 45 degrees of flow turning. As depicted, rotation of structure 404 around axis 414 provides around 22.5 degrees of flow turning, and curvature 1002 of flexible skin 428 provides around 22.5 degrees of flow turning.

Figure 11:
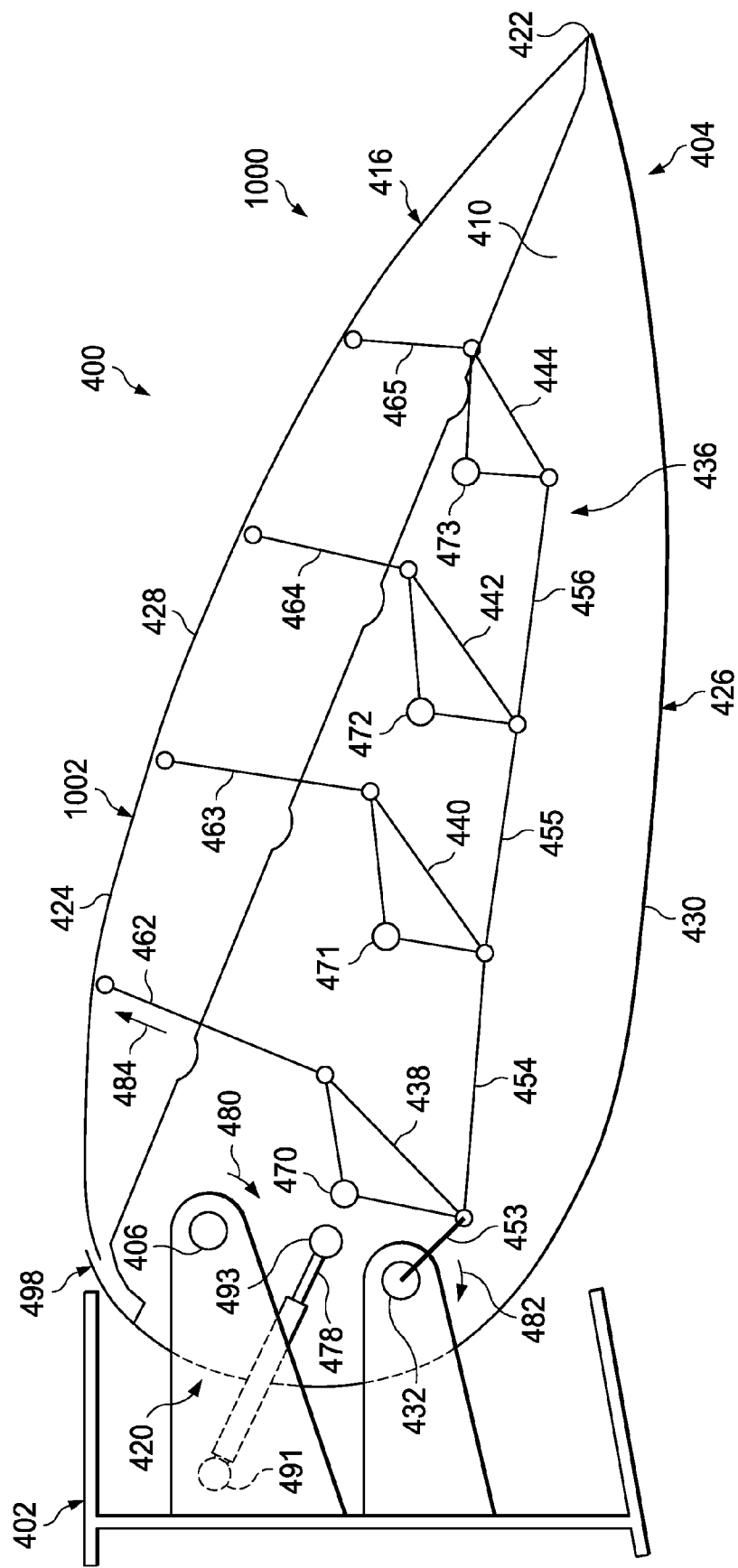
FIG. 11 is an illustration of an end view of a flap in a deployed configuration in accordance with an advantageous embodiment.

Turning now to FIG. 11, an end view of flap 400 in deployed configuration 1000 is depicted in accordance with an advantageous embodiment. In this illustrative example, flap 400 is viewed from first end 416 in deployed configuration 1000. Flap 400 has a curved shape with curvature 1002 for flexible skin 428 and around 45 degrees of flow turning in this example.

Figure 12:
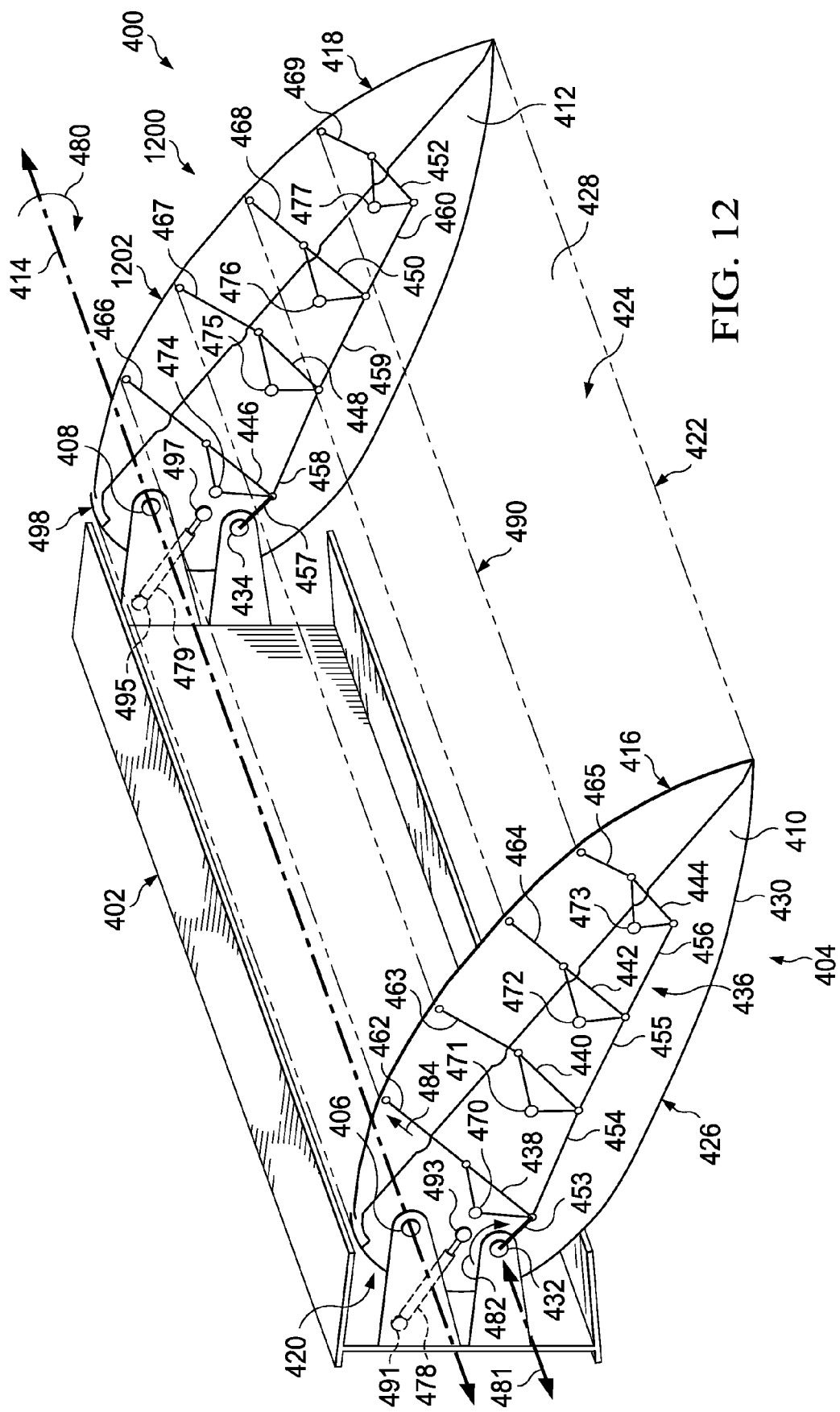
FIG. 12 is an illustration of a flap in a deployed configuration in accordance with an advantageous embodiment.

With reference now to FIG. 12, flap 400 in a deployed configuration is depicted in accordance with an advantageous embodiment. In this illustrative example, flap 400 is in deployed configuration 1200. In deployed configuration 1200, structure 404 has rotated further about axis 414 and the shape of flexible skin 428 is more curved as compared to deployed configuration 1000 in FIGS. 10-11.

In this illustrative example, deployed configuration 1200 provides around 60 degrees of flow turning. As depicted, rotation of structure 404 around axis 414 provides around 30 degrees of flow turning, and curvature 1202 of flexible skin 428 provides around 30 degrees of flow turning.

Figure 13:
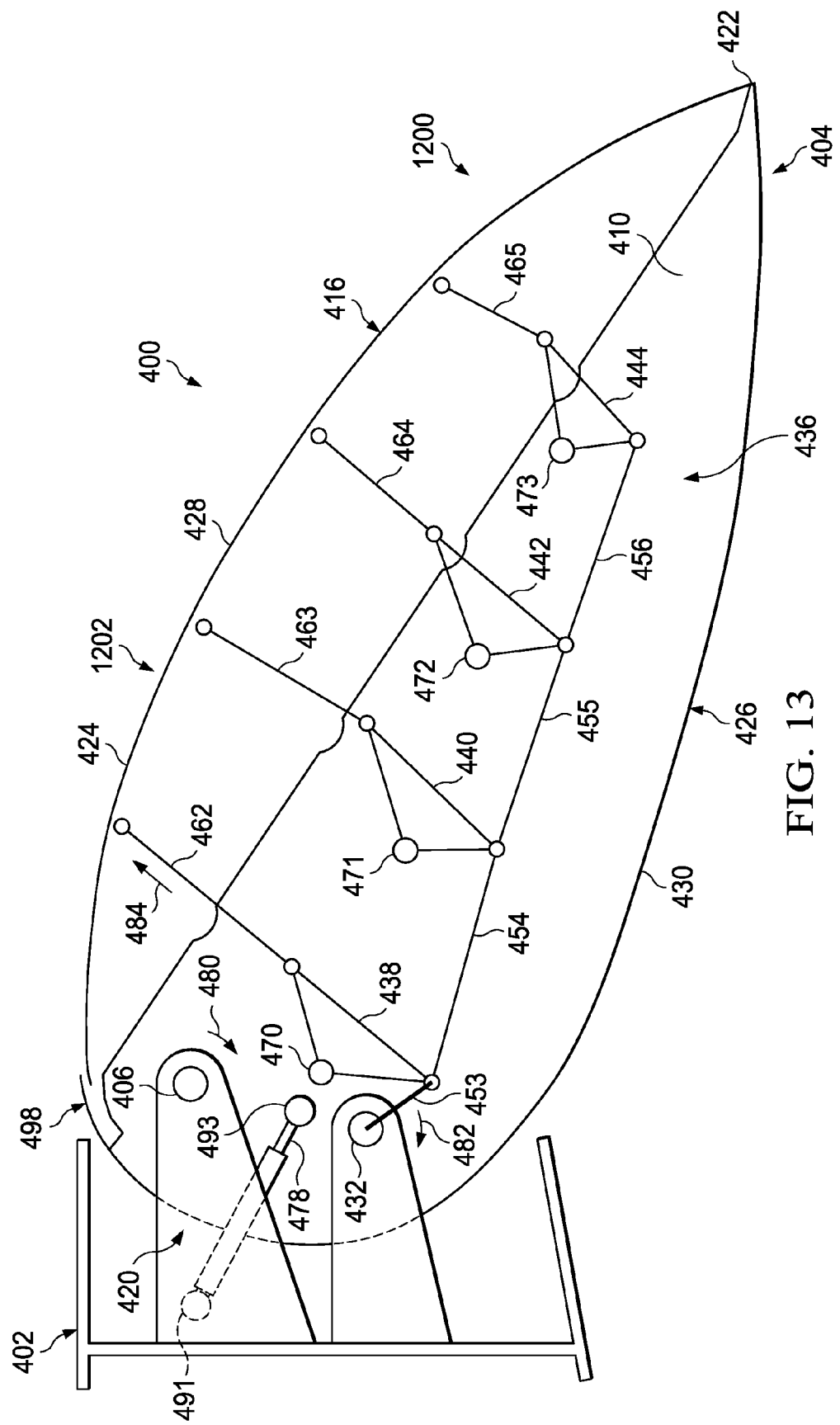
FIG. 13 is an illustration of an end view of a flap in a deployed configuration in accordance with an advantageous embodiment.

Turning now to FIG. 13, an end view of flap 400 in deployed configuration 1200 is depicted in accordance with an advantageous embodiment. In this illustrative example, flap 400 is viewed from first end 416 in deployed configuration 1200. Flap 400 has a curved shape with curvature 1202 for flexible skin 428 and around 60 degrees of flow turning in this example.

In these illustrative examples, around 60 degrees of flow turning may be the maximum amount of flow turning that flap 400 may provide. In other advantageous embodiments, flap 400 may provide a degree of flow turning greater than around 60 degrees.

The illustrations of flap 400 in FIGS. 4-13 are not meant to imply physical and/or architectural limitations to the manner in which the different advantageous embodiments may be implemented. Other components in addition to and/or in place of the ones illustrated may be used. Some components may be unnecessary in some advantageous embodiments. For example, in some advantageous embodiments, flap 400 may have only one rib or may have additional ribs to which additional linkages for assembly 436 may be attached. In yet other examples, flap 400 may have assembly 436 attached to beams that may be attached to the ribs.

Figure 14:
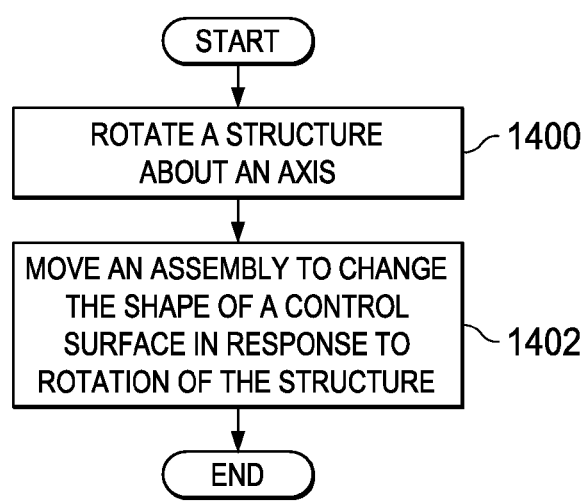
FIG. 14 is a flowchart of a method for changing a shape of a control surface in accordance with an advantageous embodiment.

With reference now to FIG. 14, a flowchart of a method for changing a shape of a control surface is depicted in accordance with an advantageous embodiment. In these examples, the process illustrated in FIG. 14 may be performed for a control surface such as, for example, without limitation, control surface 200 in FIG. 2.

The process may begin by rotating a structure about an axis (operation 1400). The structure may have a first side and a second side substantially opposite to the first side. A flexible skin may be attached to the first side of the structure, and another skin may be attached to the second side of the structure. The structure may be rotated in operation 1400 using a number of actuators.

The process then moves an assembly to change the shape of the control surface in response to rotation of the structure (operation 1402). The assembly may comprise a plurality of linkages and pluralities of connecting members connected to the structure. Thereafter, the process may terminate.

The description of the different advantageous embodiments has been presented for purposes of illustration and description, and is not intended to be exhaustive or limited to the embodiments in the form disclosed. Many modifications and variations will be apparent to those of ordinary skill in the art. Further, different advantageous embodiments may provide different advantages as compared to other advantageous embodiments.

Although the different advantageous embodiments have been described with respect to aircraft, the different advantageous embodiments may be applied to other types of platforms. For example, without limitation, other advantageous embodiments may be applied to a submarine, a personnel carrier, a spacecraft, a surface ship, and/or some other suitable object using trailing edge flight control surfaces.

The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. An apparatus comprising:
   a flexible skin of a control surface;
   a skin of the control surface, the skin associated with the flexible skin and located substantially opposite of the flexible skin;
   a structure located between the flexible skin and the skin; and
   an assembly, wherein the assembly is moveably connected to the structure, and is configured to move such that the flexible skin changes between a plurality of curvatures while a curvature of the skin, extending from a base of the control surface to a tip of the control surface, remains rigid during movement of the assembly.

2. The apparatus of claim 1, wherein the flexible skin, the skin, the structure, and the assembly form a control surface.

3. The apparatus of claim 2, wherein the control surface is selected from one of a flap, a rudder, and an elevator.

4. The apparatus of claim 2 further comprising:
   a first number of hinge points located on the structure, wherein the structure is configured to move around an axis through the first number of hinge points.

5. The apparatus of claim 4 further comprising:
   a second number of hinge points located on the structure, wherein the assembly is moveably connected to the second number of hinge points and is configured to move such that the flexible skin changes between the plurality of curvatures in response to movement of the structure around the axis.

6. The apparatus of claim 5, wherein the assembly comprises:
   a plurality of rigid structures moveably connected to the second number of hinge points located on the structure, wherein the plurality of rigid structures is connected in series to a number of fixed points.

7. The apparatus of claim 6, wherein the assembly further comprises:

a first plurality of connecting members moveably connected to the plurality of rigid structures and connecting the plurality of rigid structures in series to the number of fixed points.

8. The apparatus of claim 7, wherein the assembly further comprises:
a second plurality of connecting members having first ends moveably connected to the plurality of rigid structures and second ends connected to the flexible skin.

9. The apparatus of claim 4 further comprising:
a number of actuators connected to the structure, wherein the number of actuators is configured to move the structure around the axis.

10. The apparatus of claim 1, wherein changes in the flexible skin between the plurality of curvatures change a degree of flow turning.

11. The apparatus of claim 4, wherein movement of the structure around the axis and wherein changes in the flexible skin between the plurality of curvatures both change a degree of flow turning.

12. The apparatus of claim 8, wherein movement of the structure around the axis causes a first portion of change in the degree of flow turning, and wherein changes in the flexible skin between the plurality of curvatures cause a second portion of change in the degree of flow turning.

13. The apparatus of claim 2 further comprising:
a sliding joint located around a base of the control surface, wherein the sliding joint is configured to allow a surface of the flexible skin to slide relative to a surface of the skin.

14. The apparatus of claim 6, wherein the structure further comprises:
a number of ribs, wherein the plurality of rigid structures is connected to the number of ribs at the second number of hinge points.

15. The apparatus of claim 1, wherein the structure is connected to the skin and the flexible skin.

16. The apparatus of claim 1, wherein the skin is comprised of a material selected from at least one of aluminum, titanium, and a composite material.

17. The apparatus of claim 6, wherein the plurality of rigid structures is a plurality of linkages capable of rotating about the second number of hinge points.

* * * * *